US011700866B2

United States Patent
Zotter et al.

(10) Patent No.: US 11,700,866 B2
(45) Date of Patent: Jul. 18, 2023

(54) FOOD PRODUCTS RESEMBLING WHOLE MUSCLE MEAT AND SEAFOOD

(71) Applicant: Umaro Foods, Inc., Albany, CA (US)

(72) Inventors: Beth Alison Zotter, Albany, CA (US); Amanda Stiles, Richmond, CA (US)

(73) Assignee: Umaro Foods, Inc., Albany, CA (US)

( * ) Notice: Subject to any disclaimer, the term of this patent is extended or adjusted under 35 U.S.C. 154(b) by 0 days.

(21) Appl. No.: 17/471,225

(22) Filed: Sep. 10, 2021

(65) Prior Publication Data
US 2022/0330573 A1 Oct. 20, 2022

Related U.S. Application Data

(63) Continuation-in-part of application No. PCT/US2021/035971, filed on Jun. 4, 2021.

(60) Provisional application No. 63/177,382, filed on Apr. 20, 2021, provisional application No. 63/034,898, filed on Jun. 4, 2020.

(51) Int. Cl.
| | |
|---|---|
| A23J 3/22 | (2006.01) |
| A23L 5/46 | (2016.01) |
| A23L 17/60 | (2016.01) |
| A23J 3/14 | (2006.01) |

(52) U.S. Cl.
CPC .............. *A23J 3/227* (2013.01); *A23J 3/14* (2013.01); *A23L 5/46* (2016.08); *A23L 17/60* (2016.08); *A23V 2002/00* (2013.01)

(58) Field of Classification Search
CPC ...................................................... A23L 17/60
See application file for complete search history.

(56) References Cited

U.S. PATENT DOCUMENTS

| | | | |
|---|---|---|---|
| 4,001,441 A | 1/1977 | Liepa | |
| 4,141,999 A | 2/1979 | Lolas | |
| 4,143,164 A * | 3/1979 | Shanbhag | A23D 7/003 426/802 |
| 4,166,138 A | 8/1979 | Uecker, et al. | |
| 4,235,935 A * | 11/1980 | Bone | A23J 3/227 426/802 |
| 4,324,807 A * | 4/1982 | Kim | A23J 3/227 426/802 |
| 5,413,804 A | 5/1995 | Rhodes | |
| 8,940,354 B2 | 1/2015 | Marangoni | |
| 2001/0041207 A1* | 11/2001 | Brown | A23L 35/20 426/573 |

(Continued)

FOREIGN PATENT DOCUMENTS

| | | | |
|---|---|---|---|
| GB | 1454071 | * 2/1975 | ............. A23J 3/227 |
| WO | 1999/055165 | 11/1999 | |
| WO | 2021009075 A1 | 1/2021 | |

OTHER PUBLICATIONS

Yang CN 1030346 Jan. 1989 2 pages (Year: 1989).*

(Continued)

*Primary Examiner* — Felicia C Turner
(74) *Attorney, Agent, or Firm* — Perkins Coie LLP

(57) ABSTRACT

The present invention relates to the creation of meat-analogs, including bacon or jerky. The present invention further can relate to the use of hydrocolloid gels or films as structural components of meat analog food products. Hydrocolloid gels or films are used in order to improve the similarity of meat analog food products to whole muscle cuts of meat and seafood, including animal sourced bacon.

22 Claims, 17 Drawing Sheets

(56) References Cited

U.S. PATENT DOCUMENTS

| | | |
|---|---|---|
| 2005/0008758 A1 | 1/2005 | Howse et al. |
| 2007/0098854 A1* | 5/2007 | Van Lengerich ....... A23P 30/20 |
| | | 426/99 |
| 2007/0269571 A1 | 11/2007 | Akita et al. |
| 2008/0268112 A1 | 10/2008 | Rolan et al. |
| 2013/0216665 A1 | 8/2013 | Mason et al. |
| 2014/0154361 A1 | 6/2014 | Gerheart |
| 2016/0227831 A1 | 8/2016 | Marga |
| 2017/0105438 A1* | 4/2017 | Ajami ..................... A23L 33/17 |
| 2017/0191024 A1 | 7/2017 | Ben Ouada et al. |

OTHER PUBLICATIONS

Hwan et al. (KR 2018/0057422) May 30, 2018 7 pages (Year: 2018).*
International Search Report and Written Opinion dated Nov. 12, 2021 in Application No. PCT/US2021/035971.
International Search Report and Written Opinion dated Jan. 4, 2023 in Application No. PCT/US2022/043225.

* cited by examiner

FOOD PRODUCTS RESEMBLING WHOLE MUSCLE MEAT AND SEAFOOD

BACKGROUND

There is a growing consumer demand to find substitutes for animal proteins sourced from living animals. The demand is fueled in part by health and environmental concerns of the consumers eating the animal sourced proteins. To satisfy the consumer's desire for the taste and experience of eating meat and seafood, meat analog food products can be formulated using plant-based proteins or cultured animal cells. These plant-based proteins or cultured animal cells are aggregated to form a meat analog that is capable of mimicking the taste, texture, appearance, and overall sensory experience of cooking and eating meat from an animal source. This is due to the consumers desire for non-meat alternatives, or meat analogs, based on plant-based proteins or cultured animal cells to mimic as many of the attributes that associated with consuming real animal muscle tissue.

Extruded vegetable proteins are commonly used to make plant-based meat analogs. The process uses a shear force extrusion process to realign the plant proteins into a linear fibrous structure that results in a final product that more closely resemble the physical properties of muscle tissue found in animal meat.

A drawback to extrusion is that it is expensive. This has prevented currently available plant-based meat analogs to be sold to consumers at a competitive price when compared to "whole muscle" cuts of animal meat. Extrusion is also time consuming and can act as a bottleneck to the manufacture of plant-based meat analogs. Additionally, while extruded vegetable protein can reasonably simulate the texture and sensory properties experienced by a consumer of ground meat, it currently is not capable of duplicating the actual texture or appearance of the highly elongated fibers in "whole muscle" cuts of animal meat.

Vegetable oils liquefy at a lower temperatures than animal fats and tend to leak out of plant-based meat analogs when oil is substituted for animal fat. To contain oils in plant-based meat analogs, methylcellulose is commonly used as an additive. Methylcellulose is a chemically modified ingredient that consumers looking for "natural" or "clean label" ingredients seek to avoid. The inclusion of methylcellulose and other chemically modified ingredients on a food package label can make the product less desirable and negatively affect sales. Furthermore, the use of chemically modified ingredients can make consumers less willing to switch from animal meats to plant-based meats.

Hydrocolloid films have mechanical properties that make them useful for improving the structural integrity of fragile food products. One example is the use of a hydrocolloid film comprised of alginate for sausage casings. Hydrocolloid films also allow for thickening, gelling, emulsifying, stabilization, and coating, etc. of food products. Hydrocolloids have also been found to have a profound impact on food properties when used at levels ranging from a few parts per million for carrageenan in heat-treated dairy products to high levels of acacia gum, starch or gelatin in jelly confectionery. The primary reason behind the ample use of hydrocolloids in foods is their ability to modify the rheology of the food in which they are used. Particularly, hydrocolloids can influence the flow behavior (viscosity) and mechanical solid property (texture) of the food. The modification of texture and/or viscosity of food systems helps modify its sensory properties. As a result, hydrocolloids are commonly used as a food additive in situations where the manufacturer wants to affect the viscosity and/or texture of the final food product. Hydrocolloids can be used for thickening or for gelling. Hydrocolloids used for thickening include alginate, carrageenan, starch, xanthan, guar gum, locust bean gum, gum karaya, gum tragacanth, gum arabic and cellulose derivatives.

All hydrocolloids are hydrophilic, but not all hydrocolloids can form gels. Only a subset of hydrocolloids can form gels that are insoluble in water. Gels form when polymers arrange to form a three-dimensional structure characterized by connection points at junction zones, allowing solvent to be contained in the interstices. Hydrocolloids commonly used to make gels include alginate, pectin, carrageenan, gelatin, gellan and agar. Some hydrocolloids like alginate, carrageenan, and pectin require bonding with an ion to gel (ionotropic gelation). Calcium alginate is one example of a gel formed by the interaction of alginate with calcium ions. Other gels require setting by hot or cold temperatures. Methylcellulose is a heat set gel, and agar and carrageenan are examples of cold set gels. Hydrocolloids find use in soups, gravies, salad dressings, sauces, jams, jellies and toppings while acting as a gelling agents.

An edible film is defined as a thin layer, which can be consumed, coated on a food or placed as barrier between the food and the surrounding environment. The most familiar example of edible packaging is sausage meat in casing that is not removed for cooking and eating. Hydrocolloids can be used to produce edible films on food surfaces. Such films serve as inhibitors of moisture, gas, aroma and lipid migration. Many gums and derivatives have been used for coating proposes. They include alginate, carrageenan, cellulose and its derivatives, pectin, starch and its derivatives, among others. Since these hydrocolloids are hydrophilic, the coatings they produce have limited moisture barrier properties. However, if they are used in a gel form, they can retard moisture loss during short term storage when the gel acts as sacrificing agent rather than a barrier to moisture transmission.

In the present invention, the textural and functional properties of whole muscle tissue are mimicked, in an aspect, by the use of structural scaffolds within the interior of meat analog food products. These structural scaffolds can provide textural properties such as directional elasticity and distinct physical segmentation that resembles the visual and sensory properties of whole muscle tissue. When combined with other plant-based materials, the use of the present invention enables the manufacture of a composite meat analog food product that provides attributes associated with whole muscle cuts of animal meat. These include taste, bulk, and nutrition. For instance, a hydrocolloid film that is integrated into the structure of a plant-based meat analog can create the appearance, texture, and "bite" of a whole muscle cut of animal meat.

In addition to their advantageous mechanical properties, hydrocolloid films also can provide a substantive barrier layer that is capable of maintaining lipids such as fat and oil in the plant-based meat analog. Oils are commonly used in plant-based meat analogs to replace the fats found in animal foods. However, these oils, due to their different physical and chemical properties, tend to liquify at lower temperatures and often leak out of plant-based meat analogs when they are cooked. This leakage is visible to the consumer when cooking plant-based meat, is usually perceived as unpleasant, and is a noticeable difference from cooking animal meat. Furthermore, oils and fats play an essential role in the taste and sensory attributes of meat and meat-like food products, since the molecules responsible for flavor are often attached to lipids. The rapid loss of oils and fats during the cooking process can result in a plant-based meat analog reducing or completely losing its flavor during cooking. A common solution to this problem is to contain the oil within the food product using chemically modified ingredients such as methylcellulose, which consumers are increasingly seeking to avoid.

In the present invention, internal hydrocolloid films serve a functional advantage by acting as barrier layers within a plant-based meat analog that is capable of retaining fats and oils, in part through slowing the leakage of those substances during the cooking process. By serving as both a structural support and barrier layer to fat and oil leakage, the films can simultaneously improve the sensory properties of plant-based meat analogs in mouthfeel while also making them more closely resemble the cooking behavior of animal meats containing fats. The films can also help allow the plant-based meat analog to retain the taste that would be associated with the whole muscle cut of animal meat that is being mimicked. Further, the pliable nature of hydrocolloid films allows for close packing of segments and the potential to heat-seal layers to each other in order to contain liquid (oil, water) and prevent leakage. Using hydrocolloid films to separate layers further allows for the construction of heterogeneous composites with visible differences in texture, appearance, and taste among the food product components. This allows them to be used to create plant-based meat analogs that have the marbling effect commonly found in desirable "whole muscle" cuts of animal meat.

Existing plant-based bacon products have a range of textures, tastes, sensory feel and aromas, but they do not replicate the crispiness of cooked bacon. They typically employ a protein or starch to provide texture. However, they fail to replicate the texture and delicate percussive sound that combine to give the crispy sensation in the mouth. Additionally, plant-based bacon analogs made from soy and gluten tend to be soft and chewy when hot and crunchy when cold, while alternative compositions (such as those using fungi) tend to be stiff or spongy and cardboard-like in appearance and mouthfeel. Fungi-based bacons, such as those produced by mycelium, are fibrous and have very little fat-holding ability.

A feature that is commonly associated with bacon is its crispiness. "Crispy" bacon is a common adjective found in recipes, advertisements, and cooking forums describing bacon. The crispiness of pork bacon differentiates it from other pork products such as pork chops, sausage, ham, or prosciutto. The same is true for other foods that are associated with having a crispiness. This can include dried meat, fried meat, and dried and seasoned meats such as a jerky or those used as part of a salad.

To solve the problem of oil leakage, some plant-based meat analog products contain chemically modified cellulose compounds. Methylcellulose is a substance that has a unique property of gelling when heated. This property provides structure and helps contain oils within the food product when included in a plant-based meat product formulation. Because methylcellulose is a chemically modified ingredient, it is considered by many consumers to be artificial and therefore undesirable on the ingredient list. To satisfy the growing desire of consumers for natural, i.e. "clean label" food products, manufacturers are seeking ways to eliminate methylcellulose from their formulations.

In an embodiment of the present invention, a distinct crispy sensation is created in a food product through a microstructure comprised of oil droplets suspended in a dehydrated or partially dehydrated matrix formed by a gelled hydrocolloid (e.g. using an oleogel). Optimally, the hydrocolloid is agar, a natural polysaccharide found in red seaweed.

Furthermore, the present invention provides for a substance that simulates the texture, appearance, and sensorial feel (mouthfeel) of animal fat but which does not leak oil when heated on a skillet or in an oven and does not contain methylcellulose.

Furthermore, the present invention provides for a substance that simulates the texture, appearance, and sensorial feel (mouthfeel) of a cheese, an egg or other food product commonly consumed by a person or an animal.

The present invention provides for the creation of plant-based meat analogs that are capable of mimicking the taste, feel and look of "whole muscle" cuts of animal meat without the use of chemically modified ingredients. This comprises using hydrocolloid films to create a plant-based meat analog that resembles the structure of a "whole muscle" cuts of animal meat and allows it to be cooked by an individual, while the plant-based meat analog retains its sensory feel and taste.

SUMMARY OF THE INVENTION

An aspect of the present invention as embodied herein is to provide novel and nutritious high protein food products including components of those products that can substitute for conventional, premium, whole-muscle animal meat products such as beef, lamb, and pork loins and steaks and salmon, tuna, and swordfish filets and steaks. The inventive food products include the use of plant-based hydrocolloid films to replicate the mechanical properties of internal structure and thus texture of whole muscle animal meat, using a variety of high protein doughs such as plant-based doughs, or cultivated animal-cell based doughs, and mixtures thereof, to provide the "filler" material between hydrocolloid films.

BRIEF DESCRIPTION OF THE DRAWINGS

In the Drawings:

FIGS. 5A and 56 show a perspective view and a cross sectional view of a representative plate-like, planar-shaped layered food component;

FIGS. 11A, 11B, and 110 show a perspective and cross-sectional view of a bacon analog food product.

DETAILED DESCRIPTION

Figure 1A:
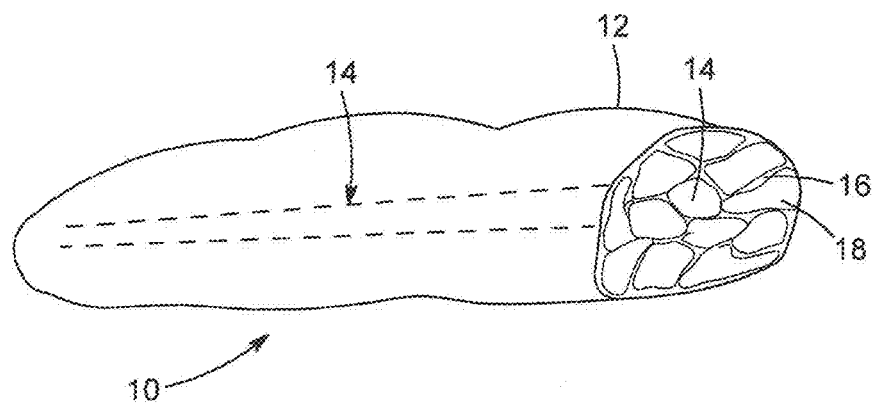
FIGS. 1A-1D show substitute finished food products using plant-based hydrocolloid films and filler dough food components to mimic, respectively, a beef loin; salmon filet; beef steak; and tuna steak.

The present invention relates to a plant-based meat analog, which in an aspect of the invention is a substitute for an animal meat that is created using components that can be plant-based or animal-based and when mixed together are able to create a meat analog that mimics the animal meat. The meat analog comprises a fat and/or an oil and a hydrocolloid film. The present invention provides for a texture and sensory feel of the plant-based meat analog that more closely mimics the texture and sensory feel of a "whole muscle" cut of animal meat. The present invention further provides for the maintenance of the structure of the plant-based meat analog during and following the application of heat, for instance, when the plant-based meat analog is cooked.

The term "animal meat" as used herein refers to flesh, whole meat muscle, muscle tissue or muscle tissue cells derived from animal cell culture, organs or any parts thereof that are derived from an animal, including fat, skin bone or other part of an animal. An animal can include a cow, a sheep, a pig, a goat, a bird, a fish, a shellfish (including a scallop, a clam, an oyster), a crustacean (including a crab, a lobster), a duck, an emu and ostrich, or any other species commonly understood to comprise a source of meat that is used for consumption by another animal, including a human.

The term "meat analog" as used herein refers to a blend of ingredients, dry and/or wet, used to make a plant-based meat-like product from either a non-animal source (e.g., proteins, carbohydrates, lipids including liquid oils, heme containing protein or an iron salt, water, and all other ingredients added with water) or from a mixture of a non-animal source and an animal source wherein the one or more of proteins, carbohydrates, lipids, water and all other ingredients added with water from which a plant-based meat-like product is prepared as described herein are produced, derived or obtained from an animal and also a non-animal source.

In an embodiment, a plant-based protein concentrate, including a seaweed protein concentrate, is derived and/or obtained from plant cells grown through cellular agriculture, wherein plant cells are grown in vitro in a bioreactor or other enclosed device. This includes a photobioreactor.

To create a meat analog and then a plant-based meat analog product, the various ingredients are blended using a mechanical force (e.g., spinning, agitating, shaking, shearing, pressure, turbulence, impingement, confluence, beating, friction, wave), a radiation energy (e.g., microwave, electromagnetic), a thermal energy (e.g., heating, steam texturizing), enzymatic activity (e.g., transglutaminase activity), chemical reagents (e.g., pH adjusting agents, kosmotropic salts, chaotropic salts, gypsum, surfactants, emulsifiers, fatty acids, amino acids), gravity or other methods that lead to protein denaturation and protein fiber alignment, or combinations of these methods, followed by fixation of the fibrous structure (e.g., by rapid temperature and/or pressure change, rapid dehydration, chemical fixation, redox).

The term "hydrocolloid film" as used herein refers to a material with an internal structure formed by the gelation of polymers into a continuous layer in which two or more polymer chains are connected at junction zones.

The term "modified plant source" as used herein refers to a plant that is altered from its native state through some form of modification to create a plant with an enhanced characteristic. The modification can occur through mutation or genetic engineering of the plant nucleotide sequence. The modification can also occur through the creation of hybrids by grafting and other methods.

The term "moisture content" as used herein refer to the amount of moisture in a material as measured, for example by an analytical method and in an embodiment, can be calculated as the percentage change in mass following the evaporation of water from a sample.

The term "natural" or "naturally occurring" as used herein refers to what is found in nature.

The terms "optional" or "optionally" mean that the feature or structure may or may not be present, or that an event or circumstance may or may not occur, and that the description includes instances where a particular feature or structure is present and instances where the particular feature or structure is absent, or instances where the event or circumstance occurs and instances where the event or circumstance does not occur.

The term "pH adjusting agent" as used herein refers to an agent that raises or lowers the pH of a substance, including a solution or a semi-solid, such as a meat analog.

The terms "polypeptide," "peptide" and "protein" are used interchangeably herein to refer to a polymer of amino acid residues. The terms apply to amino acid polymers in which one or more amino acid residue is an artificial chemical mimetic of a corresponding naturally occurring amino acid, as well as to naturally occurring amino acid polymers and non-naturally occurring amino acid polymer. Methods for obtaining (e.g., producing, isolating, purifying, synthesizing, and recombinantly manufacturing) polypeptides are well known to one of ordinary skill in the art.

The term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, gamma-carboxyglutamate, and O-phosphoserine. Amino acid analogs refer to compounds that have the same basic chemical structure as a naturally occurring amino acid, i.e., a carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid Amino acid mimetics refers to chemical compounds that have a structure that is different from the general chemical structure of an amino acid, but that functions in a manner similar to a naturally occurring amino acid.

Amino acids may be referred to herein by either their commonly known three letter symbols or by the one-letter symbols recommended by the IUPAC-IUB Biochemical Nomenclature Commission. Nucleotides, likewise, may be referred to by their commonly accepted single-letter codes.

An amino acid and derivatives thereof can comprise cysteine, cystine, a cysteine sulfoxide, allicin, selenocysteine, methionine, isoleucine, leucine, lysine, phenylalanine, threonine, tryptophan, 5-hydroxytryptophan, valine, arginine, histidine, alanine, asparagine, aspartate, glutamate, glutamine, glycine, proline, serine, tyrosine, ornithine, carnosine, citrulline, carnitine, ornithine, theanine, and taurine.

The present composition encompasses amino acid substitutions in proteins and peptides, which do not generally alter the activity of the proteins or peptides (H. Neurath, R. L. Hill, The Proteins, Academic Press, New York, 1979). In one embodiment, these substitutions are "conservative" amino acid substitutions. The most commonly occurring substitutions are Ala/Ser, Val/Ile, Asp/Glu, Thr/Ser, Ala/Gly, Ala/Thr, Ser/Asn, Ala/Val, Ser/Gly, Ala/Pro, Lys/Arg, Asp/Asn, Leu/Ile, Leu/Val, Ala/Glu and Asp/Gly, in both directions.

As to "conservatively modified variants" of amino acid sequences, one of skill will recognize that individual substitutions, deletions or additions to a nucleic acid, peptide, polypeptide, or protein sequence which alters, adds or deletes a single amino acid or a small percentage of amino acids in the encoded sequence is a "conservatively modified variant" where the alteration results in the substitution of an amino acid with a chemically similar amino acid. Conservative substitution tables providing functionally similar amino acids are well known in the art. Such conservatively modified variants are in addition to and do not exclude polymorphic variants, interspecies homologs, and alleles of the invention.

The following eight groups each contain amino acids that are conservative substitutions for one another: 1) Alanine (A), Glycine (G); 2) Aspartic acid (D), Glutamic acid (E); 3) Asparagine (N), Glutamine (Q); 4) Arginine (R), Lysine (K); 5) Isoleucine (I), Leucine (L), Methionine (M), Valine (V); 6) Phenylalanine (F), Tyrosine (Y), Tryptophan (W); 7) Serine (S), Threonine (T); and 8) Cysteine (C), Methionine (M) (see, e.g., Creighton, Proteins (1984)).

Analogue as used herein denotes a peptide, polypeptide, or protein sequence which differs from a reference peptide, polypeptide, or protein sequence. Such differences may be the addition, deletion, or substitution of amino acids, phosphorylation, sulfation, acrylation, glycosylation, methylation, farnesylation, acetylation, amidation, and the like, the use of non-natural amino acid structures, or other such modifications as known in the art.

An "isolated plant protein" indicates that the plant protein (e.g., a heme-containing protein, wheat gluten, a seaweed protein, dehydrin protein, an albumin, a globulin, conglycinin, glycinin, a zein or a protein from any of grains (including, quinoa, barley, bulgur, farro and kasha), pulse (including, lentils, dry beans, dry broad beans, dry peas, chickpeas, cow peas, pigeon peas, Bambara beans, vetches, lupins, pulses nes), cereals (including, pearl millet, proso millet, sorghum, oats, rye, teff, triticale, finger millet, fonio, foxtail millet, kodo millet, Japanese millet, Job's Tears), pseudograins (including, amaranth, breadnut, buckwheat, chia, cockscomb, pitseed goosefoot, kaniwa, wattleseed) legumes (including, alfalfa, clover, peas, beans, lupins, mesquite, carob, soybeans, peanuts, tamarind), rice, mung beans, corn, or mixtures thereof) or plant protein fraction (e.g., a 7S fraction) has been separated from other components of the source material (e.g., other animal, plant, fungal, algal, or bacterial proteins), such that the protein or protein fraction is at least 2%, at least 3%, at least 4%, at least 5%, 10%, 20%, 25%, 30%, 35%, 40%, 45%, 50%, 55%, 60%, 65%, 70%, 75%, 80%, 85%, 90%, 95%, or 99% free, by dry weight, of the other components of the source plant or animal material.

In an embodiment, a plant-based meat analog comprises a hydrocolloid film and one or more of a protein, a carbohydrate and/or an oil. The protein, carbohydrate and/or oil in an embodiment can constitute a "dough" that can be located between one or more layers of a hydrocolloid film. In a further embodiment, the dough can be used with a hydrocolloid film to create a plant-based meat analog. In a further embodiment, the plant-based meat analog provides a texture and sensory feel that mimics that found in a "whole muscle" cut of an animal meat. In another embodiment, the plant-based meat analog mimics bacon and has the look, sensory feel of animal-based bacon. This comprises the marbling between the meat and fat layers commonly found in animal-based bacon. This further comprises the ability to cook the plant-based bacon analog so that it retains the ability to provide a crispiness that is commonly found in animal-based bacon. In an embodiment, the plant-based bacon analog has the look, texture and sensory feel of bacon from a pig, a turkey, a cow, an ostrich, a chicken, a horse, a goat, a sheep, a bird, a mammal, a reptile or any other animal from which a bacon can be created.

In an embodiment, hydrocolloid film layers are heat sealed to each other to improve the mechanical properties of the food product. Heat sealing can be used to fuse two or more adjacent layers into one continuous layer. Heat sealing can be achieved by targeted application of heat to a specific area of the food product or may be applied to the whole food product by any means of cooking or thermal treatment.

In an embodiment, hydrocolloid film layers are heat sealed to adjacent dough layers to improve the texture, mechanical strength, tensile strength, or other textural property of the food product.

Oleogels can be formed from a wide range of structuring agents that will lead to different gelation mechanisms, occurring on a nano- and micro-scale and that induce specific macroscopic features (e.g., rheological/textural).

In addition, the term "oleocolloids" refers to a complex system, like a dispersion of a medium (water/air) in the oil, resulting in emulsions or foaming oleogels, or even systems like oil-in-water-in-oil (O/W/O) emulsions or layered structural matrices (oleofilms).

Based on their molecular weight, oleogelators are classified either as low-molecular-weight compounds, or polymeric gelators. The structuring agents are non triacylglycerolic oleogelators, more specifically crystalline particles or self-assembling structures, self-assembled fibrillar networks, emulsions, polymers, inorganic compounds, or lipid-based gelators such as waxes, fatty acids, fatty alcohols, or monoglycerides.

Oleogels have been applied in the development of many food products, such as spreads, bakery products, sweets, dairy, and meat products, not only for the replacement of trans and saturated fats but also because oleogels demonstrated other important roles as carriers for water-insoluble bioactive substances, stabilizers in emulsifier-free products, oil binding, or imparting heat resistance to the product.

In an embodiment of the present invention, a hydrocolloid film is comprised of an oleogel film having a hydrocolloid as an oleogelator. In an embodiment, a hydrocolloid film is composed of a blend of one or more components selected from but not limited to polysaccharides, oils, proteins, or carbohydrates. Each component may be naturally derived, synthetic, or altered by mechanical, enzymatic, or chemical or genetic methods. A variety of ingredients may be used as a polysaccharide to create a hydrocolloid. In an embodiment, these comprise cellulose, mannans, galactomannans, xyloglucans, glucomannans, arabinoxylans, pectins, a mucilage gum, exudate gum, Beta-D-glucans, alginate, agar, carrageenan, pectin, fructans, cellulose derivatives, chitosan, gum, starches, gelatin, laminarin, chitin, chitosan, xylan, arabinoxylan, mannan, laminarin, porphyran, fucoidan and a galactomannan. In an embodiment, a galactomannan comprises a locust bean gum, a senna gum, a guar gum, a tara gum and/or a fenugreek gum. In an embodiment, an exudate gum comprise a gum arabic, gum tragacanth, gum karaya and/or gum ghatti. In an embodiment, a mucilage gum comprises a psyllium gum, a yellow mustard mucilage and/or a flaxseed mucilage.

In an embodiment, an alginate is derived from a brown seaweed, including Phaeophycea. In an embodiment, an alginate is derived from *Saccharina japonica, Saccharina latissima, Undaria pinnatifida, Ecklonia cava, Lessonia nigrescens, Alaria esculenta, Macrocystis pyrifera, Laminaria hyperborea, Laminaria digitata* and *Lamainaria japonica*. Alginates can also be synthesized by bacteria *Pseudomonas Aeruginosa* and *Azobacter vinelandii*.

In a further embodiment, a carageenan is derived from red algae. In an embodiment a carageenan is derived from *Chondrus crispus, Euchema cottoni, Euchema spinosum, Gigartina skottsbergi* and/or *Iradaea laminaroides*.

In another embodiment, an agar is derived from a red algae. In an embodiment, the red-purple algae is from the class Rhodophyceae. In an embodiment an agar is derived from a species of *Gracilaria, Gracilariopsis, Agarophyton* and/or *Gelidium*.

In an embodiment a gum comprises a xanthan gum, a pullulan, a mucilage gum, an exudate gum and/or a gellan gum.

Chitin and chitosan is derived from a fungi, a yeast or a green, brown or red algae. Chitin can also be derived from the exoskeleton of insects and shells of crustaceans (shrimp, lobster and crab).

Gelatin is derived from animal connective tissue. These comprise the skins or bones or different animals.

Gelling agents include alginate, pectin, carrageenan, gellan, gelatin, agar, modified starch, methyl cellulose and hydroxypropylmethyl cellulose. In an embodiment, a hydrocolloid gelling agent and their characteristics include those provided in Table 1 below:

TABLE 1

Examples of hydrocolloid gelling agents and their characteristics

| Hydrocolloid as a Gelling Agent | Characteristics | Common Applications in Food |
| --- | --- | --- |
| Modified Starch | Thermally irreversible opaque gels formed on cooling | Dairy, desserts |
| Agar | Thermoreversible gels on cooling | Bakery products, jellies |
| κ-Carrageenan and i-carrageenan | Thermoreversible gels on cooling | Pudding, milk shakes, tofu |
| Low methoxy pectin | Thermoreversible gels on cooling at acidic pH | Jams, jellies, glazes, milk-based products |
| Methyl and hydroxypropylmethyl cellulose | Thermoreversible gels on heating | Salad dressings, cake batters, beverages, whipped toppings |
| High methoxy pectin | Thermally irreversible gels on cooling at acidic pH | Jams, jellies |

TABLE 1-continued

Examples of hydrocolloid gelling agents and their characteristics

| Hydrocolloid as a Gelling Agent | Characteristics | Common Applications in Food |
| --- | --- | --- |
| Gellan gum | Thermoreversible highly transparent gels formed on cooling | Water-based fruit flavored jellies, lemon jelly |
| Alginate | Thermally irreversible gels do not melt on heating | Restructured food, cold prepared bakery creams |

In an embodiment, a gel is a form of matter that is intermediate between a solid and a liquid, while still showing mechanical rigidity. In another embodiment, a hydrocolloid gel consists of polymer molecules that are cross-linked to form a tangled and interconnected molecule network immersed in a liquid medium, wherein the liquid medium can be water. An embodiment of a gel is a high moisture food that more or less retains its shape when released from a container, a mold or some other solid form that is capable of providing a shape to a gel. In a further embodiment, a gel is a viscoelastic system with a 'storage modulus' (G') larger than the 'loss modulus'(G"). In an embodiment, a hydrocolloid can form a gel by physical association of their polymer chains through hydrogen bonding, hydrophobic association and cation mediated cross-linking and differ from synthetic polymer gels, which normally consist of covalently cross-linked polymer chains. Hydrocolloid gels can be referred to as a "physical gel."

In an embodiment, a gel's formation involves the association of randomly dispersed polymer segments in dispersion in such a way so as to form a three-dimensional network that contains solvent in the interstices, that include in an aspect an associated region known as 'junction zones' may be formed by two or more polymer chains. The physical arrangement of these junction zones within the network can be affected by various parameters like temperature, presence of ions and inherent structure of hydrocolloid. For the gelation of hydrocolloids, the three main mechanisms proposed are ionotropic gelation, cold-set gelation and heat-set gelation.

Ionotropic gelation occurs via cross-linking of hydrocolloid chains with ions, typically a cation mediated gelation process of negatively charged polysaccharides. Examples of such systems are alginate, carrageenan and pectin. Ionotropic gelation is carried out by either diffusion setting or internal gelation. In cold-set gelation, hydrocolloid powders are dissolved in warm/boiling water to form a dispersion which on cooling results in enthalpically-stabilized inter-chain helix to form segments of individual chains leading to a three-dimensional network. Agar and gelatin form gel by this mechanism. Heat set gels require the application of heat to gel (e.g., curdlan, konjac glucomannan, methyl cellulose, starch and globular proteins). In many embodiments, it is usually only where heat setting is required in foods (e.g., the use of starch in sauces). Heat setting mechanism occurs by unfolding/expansion of native starch/protein and their subsequent rearrangement into a network.

In an embodiment a hydrocolloid gelling agent is at a concentration of 0.1-30% w/w of the hydrocolloid gel. In a further embodiment, a hydrocolloid gelling agent comprises one or more of an agar at 1%-30% w/w, an Alginate 1-30% w/w, a Carrageenan at 0.5%-30% w/w, a high methoxy pectin at 2%-30% w/w, a low methoxy pectin at 0.1%-30% w/w, a gelatin at 1%-30% w/w or a gellan at 0.5%-30% w/w of the hydrocolloid gel.

The selection of a particular hydrocolloid to be used in a specific food product depends on the characteristics of a gelling agent. An alginate can form gels without prior heating because sodium alginate is cold water soluble, and these cold-formed gels are heat stable. In an embodiment, an alginate comprises a preferred gelling agent for re-structured foods and for cold-prepared instant bakery custard that are bake-stable. The rapid setting behavior of alginate gels is also important in restructured foods, including those that æ diffusion-set. Alginates as gel forming agents also find applications in restructured fruits and vegetables, restructured fish and meat, puddings and desserts, cold prepared bakery creams, fruit preparations and bakery jam in icings and toppings, fruit pie fillings and table jellies alginates are used but they are incompatible with milk, except in the presence of calcium sequestrants.

An agar can be used in bakery products, confectionery, Japanese desserts and confections, meat, fish and poultry products, dairy products, ice cream, peanut butter and beverages. The high melting point of agar gels is improved by the addition of salts. Agar is used in baked goods where it is superior to carrageenans and far superior to gelatin. Agar is also widely used as a gelling agent in jelly confections including traditional Japanese food items and confections like Yokan, Mitsurname, Tokoroten, as well as others. Agar is also used at levels of 0.5-2% to gel canned meat, fish, and poultry products.

In an embodiment, a gel is analyzed by a rheological characterization, a structural characterization, a microscopic characterization and a molecular characterization employing different instruments like viscometers, rheometers, texture measuring systems, differential scanning calorimeters, scanning electron microscope, atomic force microscope, NMR and MR. In an embodiment, a rheological characterization of a gel is used as the results correlate to the textural attributes of the product, which, in turn, determines its sensory characteristics and consumer acceptability. The crispiness of a gel or other types of food products may be measured by the waveform and spectrogram of an audio recording, or by using an acoustic envelope detector attached to a texture analyzer.

A variety of ingredients may be used to create a hydrocolloid that comprises a carbohydrate. These comprise a starch, a flour, an edible fiber, and combinations thereof. With regard to starches, these can comprise maltodextrin, inulin, fructo oligosaccharides, carboxymethyl cellulose, microcrystalline cellulose, hemicellulose, methylcellulose, guar gum, corn starch, oat starch, potato starch, rice starch, pea starch, seaweed starch and wheat starch. In an embodiment a carbohydrate is a sugar, sugar alcohol, sugar acid and/or sugar derivative can comprise glucose, fructose, ribose, sucrose, arabinose, glucose-6-phosphate, fructose-6-phosphate, fructose 1,6-diphosphate, inositol, maltose, mannose, glycerol, molasses, maltodextrin, glycogen, galactose, lactose, ribitol, gluconic acid, glucuronic acid, amylose, amylopectin, or xylose.

They comprise alginate, carrageenan, cellulose and its derivatives, pectin, starch and its derivatives. The hydrocolloid edible films are classified into two categories taking into account the nature of their components: proteins or polysaccharides. Hydrocolloidal materials, i.e. proteins and polysaccharides, used extensively for the formation of edible films and coatings include agar and alginate.

A variety of ingredients may be used as all or part of a carbohydrate, including but not limited to starch, flour, edible fiber, and combinations thereof. Examples of suitable starches comprise but are not limited to maltodextrin, inulin, fructo oligosaccharides, pectin, carboxymethyl cellulose, guar gum, corn starch, oat starch, potato starch, rice starch, pea starch, seaweed starch and wheat starch. In an embodiment a carbohydrate is a sugar, sugar alcohol, sugar acid and/or sugar derivative can comprise glucose, fructose, ribose, sucrose, arabinose, glucose-6-phosphate, fructose-6-phosphate, fructose 1,6-diphosphate, inositol, maltose, mannose, glycerol, molasses, maltodextrin, glycogen, galactose, lactose, ribitol, gluconic acid, glucuronic acid, amylose, amylopectin, or xylose.

Examples of a suitable flour comprise amaranth flour, oat flour, quinoa flour, rice flour, rye flour, sorghum flour, soy flour, wheat flour, seaweed flour and corn flour. Examples of suitable edible fiber comprise but are not limited to barley bran, seaweed fiber, carrot fiber, citrus fiber, corn bran, soluble dietary fiber, insoluble dietary fiber, oat bran, pea fiber, rice bran, head husks, soy fiber, soy polysaccharide, wheat bran, and wood pulp cellulose. In some embodiments, some of a carbohydrate is derived from plant. The carbohydrate may be derived from any one plant source or from multiple plant sources. In some embodiments, a carbohydrate is not derived from a plant source but is identical or similar to carbohydrate found in a plant source, for example, the carbohydrate is synthetically or biosynthetically generated but comprises molecules that have an identical or similar primary structure as molecules found in a plant source.

In an embodiment, a flavoring agent can comprise one or more flavor precursors, a flavoring, or a flavoring compound. In one embodiment, a flavoring agent can be a combination of a flavoring and one or more flavor precursors. In a further embodiment, a binding agent can comprise one or more proteins that have been chemically or enzymatically modified to improve their textural and/or flavor properties, or to modify their denaturation and gelling temperatures. In a further embodiment, one or more flavoring agents can be a sugar, a sugar alcohol, a sugar acid, a sugar derivative, an oil, a free fatty acid, an amino acid or derivative thereof, a nucleoside, a nucleotide, a vitamin, an acid, a peptide, a phospholipid, a protein hydrolysate, a yeast extract, or a mixture thereof. For example, the flavor precursor can be selected from the group consisting of glucose, fructose, ribose, arabinose, glucose-6-phosphate, fructose 6-phosphate, fructose 1,6-diphosphate, inositol, maltose, sucrose, maltodextrin, glycogen, nucleotide-bound sugars, molasses, a phospholipid, a lecithin, inosine, inosine monophosphate (IMP), guanosine monophosphate (GMP), pyrazine, adenosine monophosphate (AMP), lactic acid, succinic acid, glycolic acid, thiamine, creatine, pyrophosphate, vegetable oil, algal oil, sunflower oil, corn oil, soybean oil, palm fruit oil, palm kernel oil, safflower oil, flaxseed oil, rice bran oil, cottonseed oil, olive oil, sunflower oil, canola oil, flaxseed oil, coconut oil, mango oil, a free fatty acid, cysteine, methionine, isoleucine, leucine, lysine, phenylalanine, threonine, tryptophan, valine, arginine, histidine, alanine, asparagine, aspartate, glutamate, glutamine, glycine, proline, serine, tyrosine, glutathione, an amino acid derivative, urea, pantothenic acid, ornithine, niacin, glycerol, citrulline, taurine, biotin, borage oil, fungal oil, blackcurrant oil, betaine, beta carotene, B-vitamins, N-Acetyl L-cysteine, iron glutamate and a peptone, or mixtures thereof. In another embodiment, the flavoring agent can be selected from the group consisting of a vegetable extract, a fruit extract, an acid, an antioxidant, a carotenoid, a lactone, and/or any combination of flavoring agents.

In another embodiment, a flavoring agent can comprise a lactone selected from the group consisting of tetrahydro-6- methyl-2H-pyran-2-one, delta-octalactone, 5-ethyldihydro-2(3H)-furanone, butyrolactone, dihydro-5-pentyl-2(3H)-furanone, dihydro-3-methylene-2,5-furandione, 1-pentoyl lactone, tetrahydro-2H-pyran-2-one, 6-heptyltetrahydro-2H-pyran-2-one, .gamma.-octalactone, 5-hydroxymethyldihydrofuran-2-one, 5-ethyl-2(5H)-furanone, 5-acetyldihydro-2(3H)-furanone, trans-3-methyl-4-octanolide 2(5H)-furanone, 3-(1,1-dimethylethyl)-2,5-urandione, 3,4-dihydroxy-5-methyl-dihydrofuran-2-one, 5-ethyl-4-hydroxy-2-methyl-3(2H)-furanone, 6-tetradecalactone, and dihydro-4-hydroxy-2(3H)-furanone. In some embodiments, the lactones can be 5-ethyl-4-hydroxy-2-methyl-3(2H)-furanone, butyrolactone, gamma-octalactone, and 6-tetradecalactone.

In another embodiment, a flavoring agent can be a juice from a plant, including a vegetable. The juice can be a vegetable puree, a vegetable extract, a fruit juice, a fruit puree, or a fruit extract. In an embodiment, a vegetable juice, vegetable puree, vegetable extract, a fruit juice, a fruit puree, or a fruit extract is a Cucumis juice, puree, or extract from a cucumber or a melon. In an embodiment, the proteins in a vegetable juice, vegetable puree, vegetable extract, fruit juice, fruit puree, or fruit extract are denatured. Denaturation can be done by cooking or otherwise treating a protein prior to its addition to a plant-based meat-like product. In one embodiment, the vegetable juice, vegetable puree, vegetable extract, fruit juice, fruit puree, or fruit extract can be denatured by heating to about 40 degree. C., to about 50 degree. C., to about 60 degree. C., to about 70 degree. C., to about 80 degree. C., to about 90 degree. C., to about 100 degree. C., to about 110 degree. C., to about 120 degree. C. or to about 130.degree. C., prior to addition to the plant-based meat-like product.

In an embodiment, a plant-based meat-like product is made to have a flavor that is close to or replicates meat from an animal by using one or more carotenoids, wherein the carotenoids are selected from the group consisting of (3-carotene, zeaxanthin, lutein, trans-(3-apo-8'-carotenal, lycopene, canthaxanthin, and combinations thereof.

In an embodiment, a flavoring agent can be a mixture used to make a broth that can be made by combining a heme containing protein or iron salt with one or more other flavoring agents and a fat. The broth can be created by heating the mixture to obtain a flavored broth containing one or more flavoring agents. Suitable flavoring agents to be included in a broth comprise sugars, sugar alcohols, sugar derivatives, free fatty acids, triglycerides, alpha-hydroxy acids, dicarboxylic acids, amino acids and derivatives thereof, nucleosides, nucleotides, vitamins, peptides, phospholipids, lecithin, pyrazine, creatine, pyrophosphate and organic molecules.

In an embodiment, a flavoring agent can include a polar group, including those the group consisting of choline, ethanolamine, serine, phosphate, glycerol-3-phosphate, inositol and inositol phosphates. In another embodiment, flavoring agents can comprise (e.g., 5'-ribonucleotide salts, glutamic acid salts, glycine salts, guanylic acid salts, hydrolyzed proteins, hydrolyzed vegetable proteins, insomniac acid salts, monosodium glutamate, sodium chloride, galacto-oligosaccharides, sorbitol, animal meat flavor, animal meat oil, artificial flavoring agents, aspartamine, fumarate, garlic flavor, herb flavor, malate, natural flavoring agents, natural smoke extract, natural smoke solution, onion flavor, shiitake extract, spice extract, spice oil, sugars, yeast extract). In a further embodiment, a plant-based meat analog can comprise a coloring agent.

In one embodiment, a coloring agent comprises FD&C (Food Drug & cosmetics) Red Nos. 14 (erythrosine), FD&C Red Nos. 17 (allura red), FD&C Red Nos. 3 (carmosine), FD&C Red Nos. 4 (fast red E), FD&C Red Nos. 40 (allura red AC), FD&C Red Nos. 7 (ponceau 4R), FD&C Red Nos. 9 (amaranth), FD&C Yellow Nos. 13 (quinoline yellow), FD&C Yellow Nos. 5 (tartazine), FD&C Yellow Nos. 6 (sunset yellow), artificial colorants, natural colorants, titanium oxide, annatto, anthocyanins, beet juice, beta-APE 8 carotenal, beta-carotene, black currant, burnt sugar, canthaxanthin, caramel, carmine/carminic acid, cochineal extract, curcumin, lutein, mixed carotenoids, monascus, paprika, red cabbage juice, riboflavin, saffron, titanium dioxide, turmeric.

In an embodiment, the plant-based meat analog comprises at least 0.00001%, at least 0.0001%, at least 0.001%, at least 0.01%, at least 0.1%, at least 1%, at least 2%, at least 3%, at least 4%, at least 5%, at least 6%, at least 7%, at least 8%, at least 9%, at least 10 or more by weight of a flavoring agent. In an embodiment, the plant-based meat analog comprises about 0.00001%, about 0.0001%, about 0.001%, about 0.01%, about 0.1%, about 1%, about 2%, about 3%, about 4%, about 5%, about 6%, about 7%, about 8%, about 9%, about 10% or more by weight of a flavoring agent. In an embodiment, the plant-based meat analog comprises no more than 0.00001%, no more than 0.0001%, no more than 0.001%, no more than 0.01%, no more than 0.1%, no more than 1%, no more than 2%, no more than 3%, no more than 4%, no more than 5%, no more than 6%, no more than 7%, no more than 8%, no more than 9%, no more than 10% or more by weight of a flavoring agent.

In a further embodiment, the plant-based meat analog comprises at least 0.1%, at least 0.5%, at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least or 20% by weight of a binding agent. In a further embodiment, the plant-based meat analog comprises about 0.1%, about 0.5%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about or 20% by weight of a binding agent. In a further embodiment, the plant based meat analog comprises no more than 0.1%, no more than 0.5%, no more than 1%, no more than 2%, no more than 3%, no more than 4%, no more than 5%, no more than 6%, no more than 7%, no more than 8%, no more than 9%, no more than 10%, no more than 11%, no more than 12%, no more than 13%, no more than 14%, no more than 15%, no more than 16%, no more than 17%, no more than 18%, no more than 19%, no more than or 20% by weight of a binding agent.

In an embodiment, a binding agent is added to the plant-based meat analog to achieve a cohesive texture, tensile strength and feel. In one embodiment, a binding agent comprises a carob bean gum, cornstarch, dried whole eggs, dried egg whites, gum arabic, konjac flour, maltodextrin, potato flakes, tapioca starch, wheat gluten, vegetable gum, porphyrin, carrageenan, methylcellulose, and/or xanthan gum. One of skill will recognize that a binding agent can be determined by testing two or more different binding agents to determine which one achieves the desired cohesive texture, tensile strength and feel. In one embodiment, the binding agent is carrageenan and/or methylcellulose.

A challenge with replicating animal fats with plant-based ingredients is the lower melting temperature of vegetable oils compared to animal fats. As a result, oils used in plant-based meat products tend to leak out of the product when cooked, creating an unrealistic and undesirable cooking experience compared to cooking real animal meat.

To solve the problem of oil leakage, some plant-based meat products contain methylcellulose or other cellulose derivatives. Methylcellulose is a substance that has a unique property of gelling when heated. This property provides structure and helps contain oils within the food product when included in a plant-based meat product formulation.

Because methylcellulose is a chemically modified ingredient, it is considered by many consumers to be artificial and therefore undesirable on the ingredient list. As a result, manufacturers are seeking ways to eliminate methylcellulose from their formulations.

In an embodiment, a food product includes a composition that mimics animal fat without the use of methylcellulose.

In another embodiment of the present invention, a food product with internal hydrocolloid film is provided where the entire film is plant-based. In one embodiment, the hydrocolloid film is composed of a polysaccharide such that it is at least 2%, at least 3%, at least 4%, at least 5%, 10%, 20%, 25%, 30%, 35%, 40%, 45%, 50%, 55%, 60%, 65%, 70%, 75%, 80%, 85%, 90%, 95%, or 99% free, by dry weight, of the other components of the source material. In another embodiment, the hydrocolloid film is composed of a protein such that it is at least 2%, at least 3%, at least 4%, at least 5%, 10%, 20%, 25%, 30%, 35%, 40%, 45%, 50%, 55%, 60%, 65%, 70%, 75%, 80%, 85%, 90%, 95%, or 99% free, by dry weight, of the other components of the source material.

The term "whole muscle" refers to cuts of animal meat and seafood that maintain some or all the structure of muscle tissue from the living animal intact, e.g. food products that are minimally processed. The term is intended to include food products having undergone typical preparations for animal meat and seafood such as cutting into steaks or fillets, or the trimming or cutting of fat, skin, bone, scales, organs, connective tissue, or inedible portions of the animal carcass. The term is also intended to include cured or dried meats.

Bundles of muscle fibers, called fascicles, are covered by a perimysium sheath. Muscle fibers are covered by the endomysium. Muscle grain and muscle fascicles are known to vary significantly between muscle types. Fascicles vary in size, from approximately 1-10 mm. A larger bundle size of fibers would presumably translate into a firmer meat texture. Fascicle size is correlated to sensory tenderness and shear force texture in meat. Thickness of the perimysium has been shown to be correlated to shear force in chicken and pork. Thicker perimysium melts more slowly and thicker regions have a different composition such as more typed-I collagen, more heat-stable elastin, or more cross-links.

Myofiber adhesion to perimysium and fiber-fiber adhesions are the most fragile structures in cooked meat. The initial fracture plane is usually at the endomysium-perimysium junction. When stress is applied parallel to the fiber plane, the fracture occurs in the endomysium, whereas when stress is applied perpendicular to the fiber plane, the fracture occurs at the perimysium-endomysium junction.

The term "plant-based" refers to any substance derived from plants, fungi, bacteria, cyanobacteria, macroalgae, or microalgae and includes microorganisms and substances produced via fermentation, whether by naturally occurring or genetically modified microorganisms. It is not intended to encompass products made from the butchering or capture of farmed or wild-caught animals.

The term "dehydration" means the partial or complete removal of water from a substance. A "dehydrated" product is meant to convey a substance that has had some water, but not necessarily all water, removed from its initial state prior to the start of dehydration of the product. Dehydration can be for 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225 230, 240, 245, 250, 255, 260, 265, 270, 295, 280, 285, 290, 295 minutes or more.

In an embodiment, a cheese analog is comprised of an oil-in-hydrocolloid gel, wherein the oil-in-hydrocolloid gel comprises about 25% to 90% oil, about 0% to 30% protein, about 4% to 20% agar, about 0% to 8% salt, and about 20% to 70% water. In another embodiment of the present invention, a cheese analog is comprised of an oil-in-hydrocolloid gel, wherein the oil-in-hydrocolloid gel comprises at least 2%, at least 3%, at least 4%, at least 5%, 10%, 20%, 25%, 30%, 35%, 40%, 45%, 50%, 55%, 60%, 65%, 70%, 75%, 80%, 85%, 90%, 95%, or 99% water.

In another embodiment, an egg analog, including a cooked egg analog is comprised of an oil-in-hydrocolloid gel, wherein the oil-in-hydrocolloid gel comprises about 25% to 90% oil, about 0% to 30% protein, about 4% to 20% agar, about 0% to 8% salt, and about 20% to 70% water.

Bacon is a food product that is typically cut from the belly or loin of a pig but can also be made from other animal meats, including turkey. Bacon is typically cured using a combination of salt, sugar, and smoke, which also act as flavorings. Other flavorings comprise brown sugar, maple syrup, molasses, honey, garlic, alcohols such as bourbon, and different wood species such as applewood, cherrywood, and hickory. Smoke and other flavors can be either natural or artificial and include liquid smoke. Bacon sold as "cured" is usually used to denote bacon cured with nitrates as a preservative.

Depending on the degree of cooking, the texture of bacon can be manipulated from a texture that is chewy and soft when cooked for a shorter period of time, to crispier and crunchier when cooked for a longer period time and the bacon becomes tougher in texture, and even burned or charred.

Bacon is popular around the world, however it is prepared, seasoned, and served in many different ways and forms depending on the region. In the United States, bacon is typically prepared as thin slices of pork belly. It is usually smoked and consumed as a hot side dish, often with breakfast. It is also commonly served at lunch in salads and sandwiches, for example in a bacon-lettuce-and-tomato sandwich. Another common use of bacon is as a topping on burgers, for example on a bacon cheeseburger or a chicken club sandwich, which includes a grilled or fried chicken breast or strip, bacon, lettuce and tomato. Bacon is even consumed as a sweet, for example in a chocolate-covered bacon or a deep-fried breaded bacon. The characteristic appearance of American bacon is of alternating stripes of fat, which are generally clear and meat, which has a reddish color. The stripes of fat and meat can be in relatively equal proportions, or one can be greater than the others.

Canadian bacon is cut from the loin of the pig, and is a lean cut, with little visible fat. English rasher is a type of bacon cut from the pig loin, but which contains more fat than Canadian bacon, and is commonly eaten as a breakfast food. Italian pancetta is a bacon typically cured rather than smoked, is prepared cubed or very thinly sliced, and often used as a topping for vegetables, sauces, and pizzas. Chinese La Rue, or "Lap Yuk," is a bacon cut from the pork belly and comes with the pigskin attached that forms a rind, and it is typically air-cured with soy sauces, brown sugar, and spices until it's hard. Or it's briefly cured until it is smoked. Sometimes liquor such as "Baijiou" is used to cure the meat. French lardons are a type of bacon that is prepared as small cubes of fatty pork belly. They are often fried and used as additions to quiche or salads. Lardons are typically cured, but not smoked, before cooking. Hungarian bacon is frequently prepared with garlic and paprika and sliced and smoked and is often served skewered and cooked over a fire. German bacon is called "Bauchspeck" and consists of the fatty cuts of pork from the pork belly, and it contains layers of meat and fat. This cut is frequently diced or cut into strips and often cured and smoked. Typically Bauchspeck is used for cooking, but it is sometimes served alongside appetizers. Korean bacon is called "Samgyeopsal-gui" and is thinly sliced grilled pork belly. The most common cooking method is on a Korean BBQ grill. This cut is typically cooked plain or with garlic.

Another aspect of bacon is that it can become rigid and stiff when cooked. This rigid and stiffness is capable of imparting a crispiness to the bacon, which in an embodiment also makes it crunchy to bite. In an embodiment, it is a desirable outcome to create a bacon that is crispy and crunchy.

Bacon is also able to be eaten as a snack by hand without the use of utensils such as a fork and knife.

Jerky is a type of dried meat that is like, or can be a bacon, which is cured and further dried. An embodiment of the present invention is a jerky.

Jerky is a dried and cured meat, typically thinly sliced, from any number of meats for example beef, turkey, bison, elk, venison, pork, chicken, duck, goose, and ostrich. Typical seasonings for jerky comprise salt, sugar, and smoke, and popular flavors comprise teriyaki, citrus, pineapple, black truffle, hickory, honey, liquid smoke, vinegar, pepper, jalapeno, garlic, and alcohols such as whiskey or bourbon. Nitrates may sometimes be added as preservatives.

Jerky is typically low in moisture and has a water to protein ratio of about 0.75 to 1. The dehydration process of the meat analog in the present invention may be used to create the texture, mouthfeel, and appearance of a food product resembling jerky from a number of meat sources, including the aforementioned animal meats.

Beef jerky and other meat jerky types are often characterized by a segmentation of meat and fat that creates a marbled texture, with chunks of dark meat surrounded by lighter colored tissue that is often sinewy or fatty. This segmentation creates a texture and mouthfeel that allows the jerky to tear along the tissue in a distinctive manner when a pulling force is applied, such as when a piece is eaten, and a bite is torn away from the remaining piece of meat. The binding force of the tissue and the tension force required to tear jerky is a characteristic feature of jerky and bacon.

The segmentation pattern allows for an ease of tearing by hand into smaller bite size pieces. In an embodiment of the present invention, hydrocolloid films are used to create a segmentation pattern and/or structure to a jerky meat analog that resembles the texture, appearance, and mouthfeel of a jerky and that also reproduces a similar mechanical tearing force when the jerky is pulled apart. In an embodiment, this jerky meat analog is made with a plant-based protein concentrate. In a further embodiment, the plant-based protein concentrate is made with a seaweed protein concentrate. To give the jerky meat analog its look, colorings and flavorings can be added to the mixture used to create the jerky meat analog. Among the flavorings that can be added are smoke, beef, turkey, bison, elk, venison, pork, chicken, duck, goose, and ostrich or combinations of two or more flavorings to create a final jerky meat analog.

Sinew is fibrous, linear tissue that in an animal binds muscle to bone, bone to bone, usually a tendon or ligament. In an embodiment of the present invention, hydrocolloid films or hydrocolloid-based oleogels are used to reproduce the texture and mouthfeel of a sinew-like portion of an animal meat, including a jerky.

In an embodiment of the present invention, the food product is intended for consumption by a pet such as a dog or a cat. In an embodiment, a pet can be a dog, a cat, a hamster, a gerbil, a horse, a pig, a goat, a cow, a sheep or a reptile.

Figure 8:
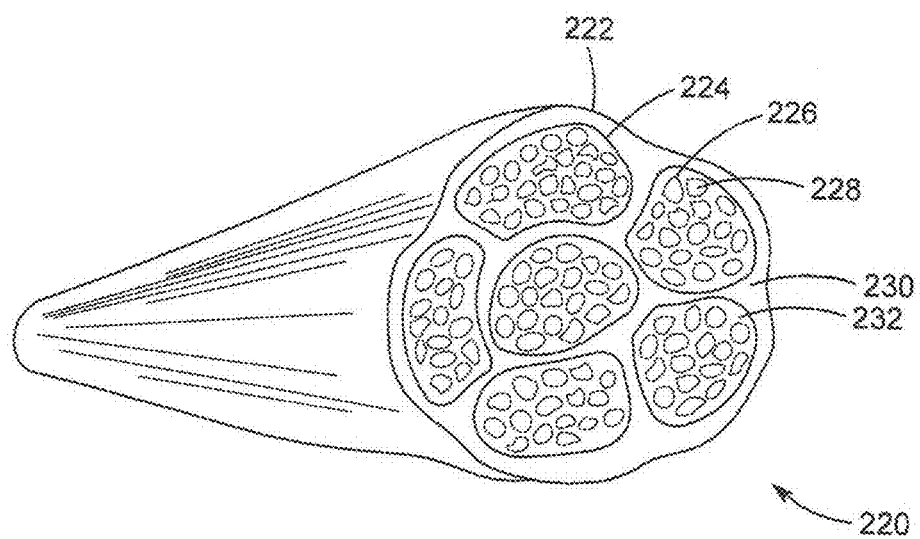
FIG. 8 shows a perspective and cross-sectional view of a layered food component resembling bundled muscle fibers.
Figure 9:
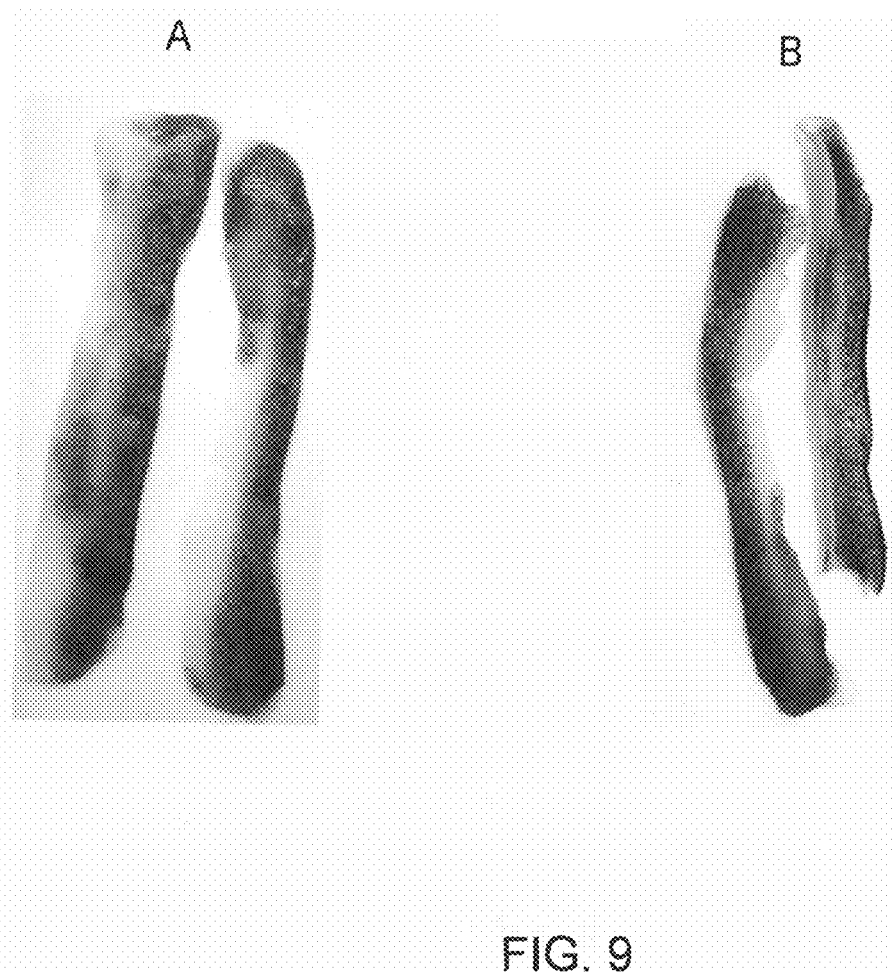
FIG. 9 shows bacon analog strips before (9A) and after dehydration (9B).
Figure 10:
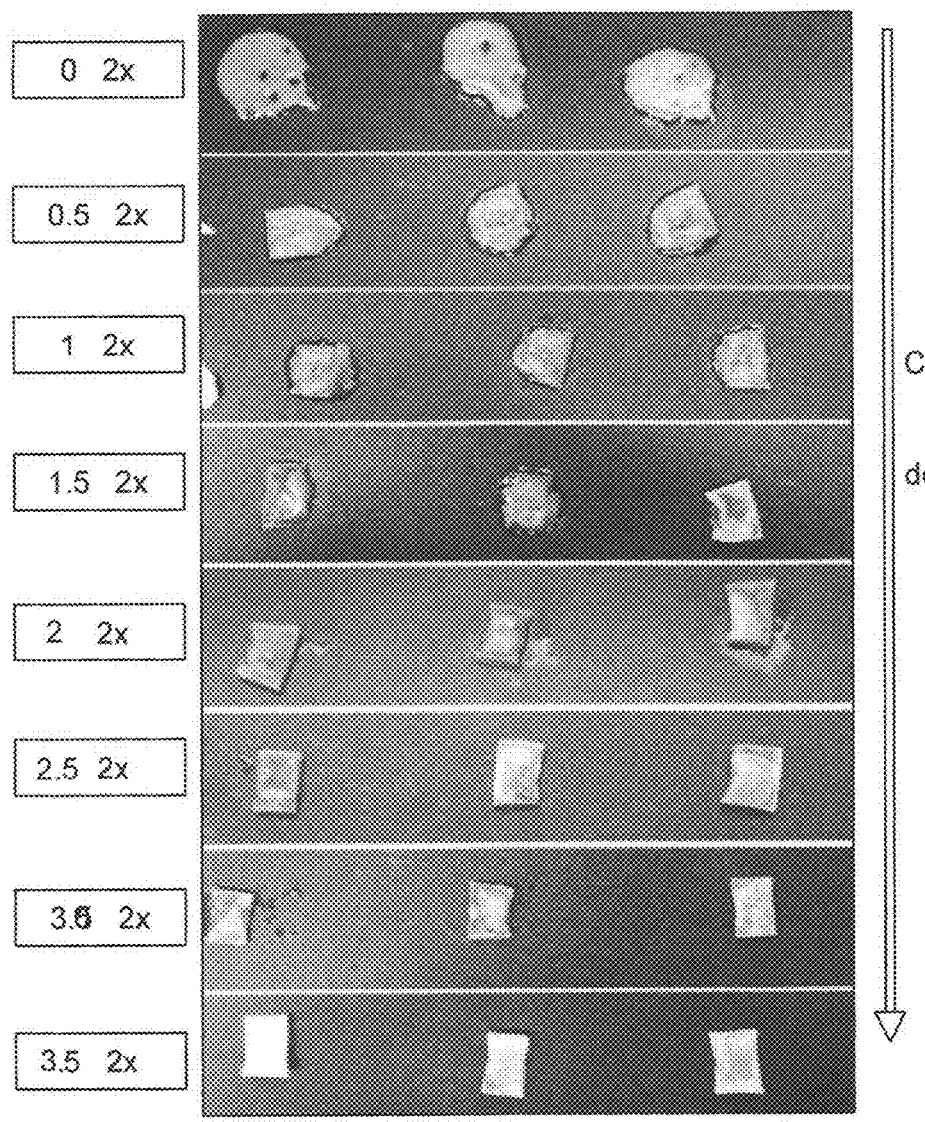
FIG. 10 shows bacon fat analogs after progressive levels of dehydration, followed by the subsequent application of heat.

With regard to embodiments of the present invention, FIGS. 1A-10 show, respectively, views of representative a finished food product comprising a plant-based meat analog in accordance with the present invention. In this embodiment, the finished food product comprising a plant-based meat analog is shaped like a beef loin, a salmon filet (both with partial cross-sections), a planar view of a "steak-cut" shape from beef or pork, and a steak-cut of a large fish (e.g. salmon, swordfish, or tuna). In an embodiment, a finished food product comprising a plant-based meat analog shown in FIGS. 1A-10 include the use of plant-based hydrocolloid films 16, 26, 32 to provide the internal structure and external structure, for example 12, 22, 33 and thus texture for a variety of filler doughs such as plant-based doughs or cultivated animal cell-based doughs and mixtures thereof. In an embodiment, the meat analog can be comprised of portions that mimic the color and texture of meat 18, 28, 36 or 46 that are interspersed with portions that mimic the color and texture of a fat 14, 24, 34 or 44 wherein the fat or the meat continue throughout the meat like analog. In an embodiment a pork roast (FIG. 1A), a salmon (FIG. 1B), a beef or pork steak (FIG. 10) or a steak cut of a large fish (FIG. 10). In each of FIGS. 1A-10 the lines through the cut of meat or fish correspond in an embodiment to a hydrocolloid film that in each instance can be used to provide in an aspect, the structure, the texture and feel of the meat analog.

In a particular embodiment, FIG. 1A depicts a whole beef tenderloin 10 having an outer hydrocolloid film 12 which acts to contain and shape the assembled individual meat analog food product components 14. These components 14 in one embodiment are generally tubular in shape and each includes a separate hydrocolloid film layer 16 enclosing a dough layer 18, which can comprise either a fat or meat mimic, or an interspersed blend of each, wherein the dough layer can be derived or come from an animal, plant or insect. In addition, such as for large dough layer thicknesses, the end of a hydrocolloid film 16 may be embedded in a dough layer 18 to provide further internal structural support by partially or totally dividing portions of a dough layer 18.

Figure 1B:
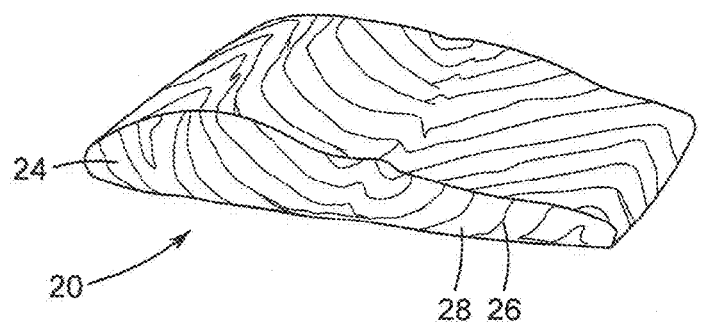
Figure 1C:
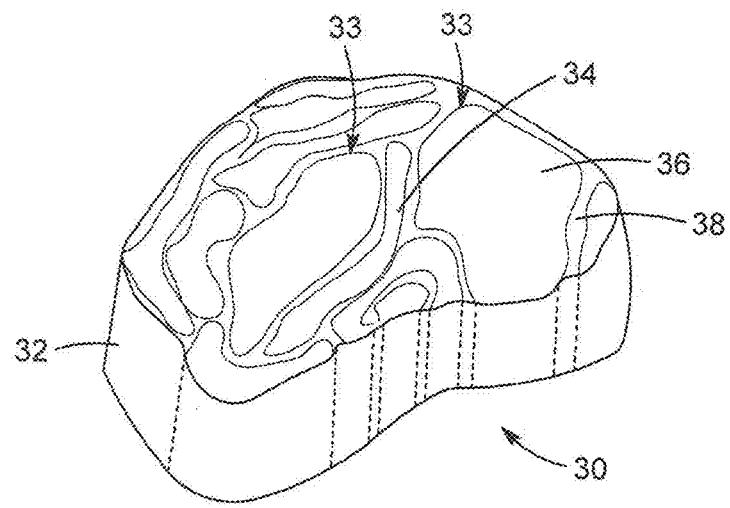
Figure 1D:
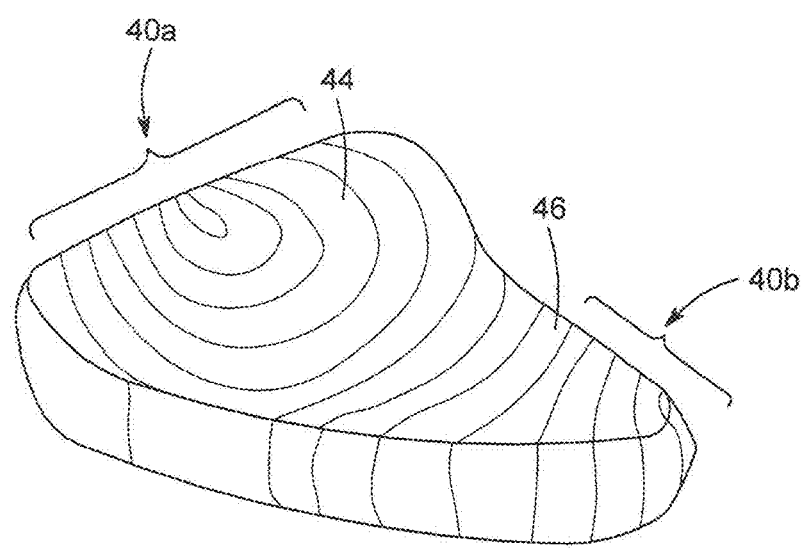

In comparison to the substitute beef food product meat analog shown in FIG. 1A, the substitute fish (salmon) food product meat analog 20 depicted in FIG. 1B has components 24 that are more plate-like and planar in shape to create the "flake-like" texture and appearance of some fish (e.g. haddock, salmon, etc.) when consumed. Each of components 24 includes, however, a separate hydrocolloid film 26 on either side of the "flake-like" texture that encloses a dough 28.

Still further, FIG. 10 depicts a novel finished food product meat analog that can mimic the "steak-cut" shape of beef as mentioned above using plant-based hydrocolloid films and an appropriate filler dough. Specifically, food product 30 contains a plurality of food product components 33 each having a film 34 and filler dough 36. In FIG. 10 embodiment, the outermost film 32 constrains food product component 33. The inner films 34 divides the dough, which can comprise either a fat or meat mimic, or an interspersed blend of each, into segments to provide internal product structure and improved texture. To further resemble the marbling of fat found in certain steak cuts of whole-muscle meat, a dough layer 38 fills the interstices between the larger dough "tubes" and is composed of a substance resembling animal fat, and which may contain a saturated oil or whitening agent to create an opaque appearance.

In an embodiment a "tube" or "tubes" or "tubular" can be in any shape, including a circle, a square, a triangle, or any shape, geometric or not within which a dough can be located. In another embodiment, a "tube" or "tubes" or "tubular" can comprise a hydrocolloid film that encapsulates or provides a border within which a dough is located. To the extent that a hydrocolloid film is a border, it does not have to encapsulate or encompass a dough on all sides. Instead a dough can be exposed on one or more sides where a hydrocolloid film is not located.

A substitute steak-shaped finished food product meat analog can also be constructed by appropriately assembled tubular or planar food product meat analog components shown in FIG. 1A or FIG. 1B or combinations of these components. FIG. 10 shows a finished food product meat analog 40 mimicking a steak-cut of a large fish that uses tubular-shaped food components 44, typically near the fish spine region 40a, and assembled with planar-shaped food component meat analog 46 in the tapering side region 40b.

The present invention also relates to structures providing layered food component meat analogs, a plurality of which can be assembled into finished food product meat analogs, such as the ones depicted in FIGS. 1A-10. As stated above, the layered food component meat analogs can be assembled in shapes that resemble the shapes and cuts of animal (e.g. beef, pork, chicken, fish, etc.) products, including the striations associated with the fat and meat portions of an animal derived meat that are traditionally sold to consumers in cooked or raw form.

Figure 2A:
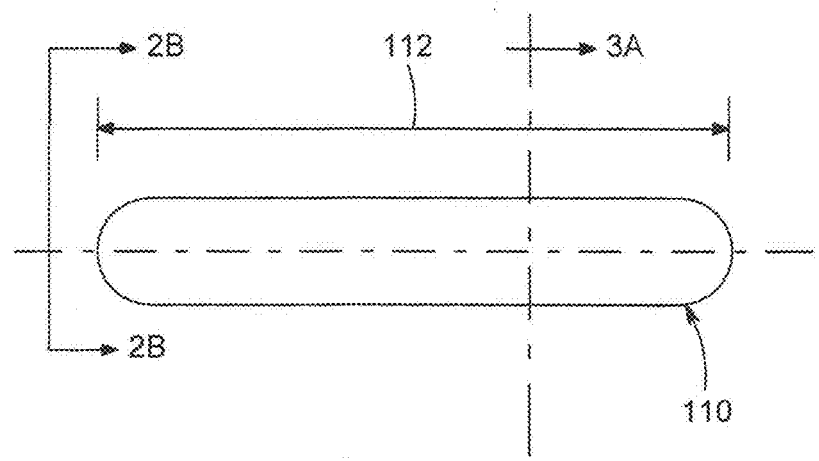
FIGS. 2A and 2B show side and end views of a representative tubular shaped layered food component.
Figure 2B:
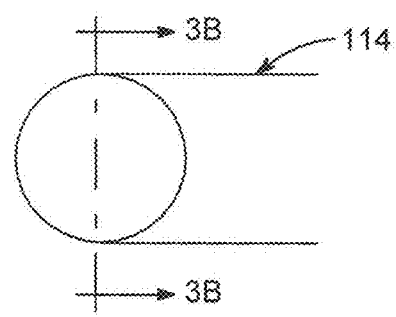

As embodied herein, with reference to FIGS. 2A and 2B, a representative layered meat analog food component 110 is shown. Component 110 is generally tubular shaped that is, having a characteristic length 112 and thickness 114. In one embodiment member 110 has a thickness of about 0.5 cm and an unstretched length of about 10 cm, yielding a length/thickness ratio of about 20. While FIG. 2A depicts a generally straight, linear shape of component 110, a slightly curved or bent shape can be employed. Similarly, while the cross-section of 110 in FIG. 2B depicts a generally round, uniformly circular shape, other shapes can be configured, such as oval, partially indented, or irregular.

Figure 3A:
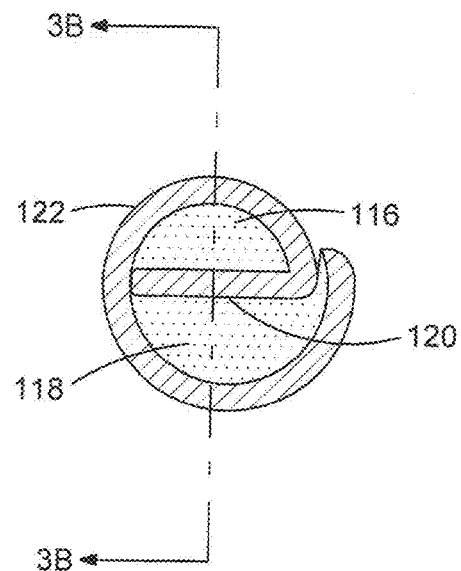
FIGS. 3A and 3B show longitudinal and axial enlarged cross-sections of the layered food component in FIGS. 2A and 2B.
Figure 3B:
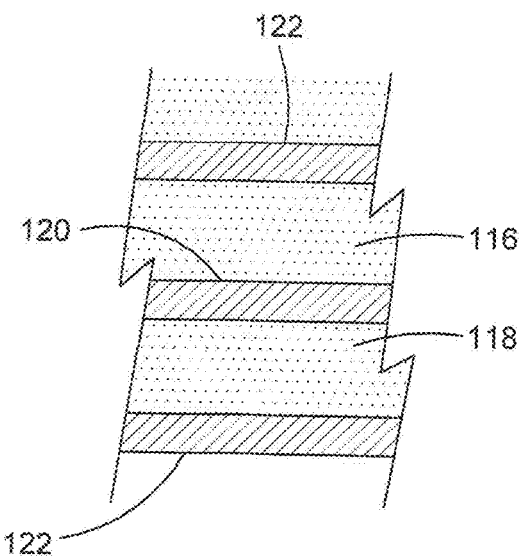

Referring to the enlarged cross sections of layered meat analog food component 110 shown in FIGS. 3A and 3B, at least two adjacent layers 116, 118, of filler dough separated by a thin hydrocolloid film 120 and enclosed by hydrocolloid film 122 as shown. In an embodiment, dough layers 116, 118 can be any aforementioned dough, including animal-based, and further including natural or cultured cells, or plant-based, preferably having a high protein component. Each of dough layers 116, 118, may be of the same or different compositions and textures. Dough layers 116 and 118, which can comprise either a fat or meat mimic, or an interspersed blend of each, may be paste-like or preformed (e.g. extruded semi-circular) with moderately cohesive strips. The compositions of dough layers 116, 118 should contain appropriate amounts of oil and water, and may have suitable flavoring ingredients (e.g. salt, pepper, spices, etc.) depending on the intended finished food product.

Importantly, while the outer hydrocolloid film layer 122 of FIG. 3A functions generally to constrain the contents of layered meat analog food component 110, the inner hydrocolloid film 120 provides internal support or scaffolding for the filler dough layers 116, 118, which can comprise either a fat or meat mimic, or an interspersed blend of each. This internal support can be used to influence the desired texture of the final meat analog food product as well as the ability to use different filler dough compositions for layer 116 and layer 118. While hydrocolloid film layers 120 and 122 are shown as parts of the same film sheet for obvious ease of manufacturing (e.g. rolling or folding), this invention also contemplates separate film layers using different hydrocolloid materials and/or film thicknesses to influence not only the texture, but also the overall performance of components 110 (e.g. elasticity, bendability, etc.), in assembling the desired final meat analog food product, and thus the performance of the final food product as well.

Figure 4A:
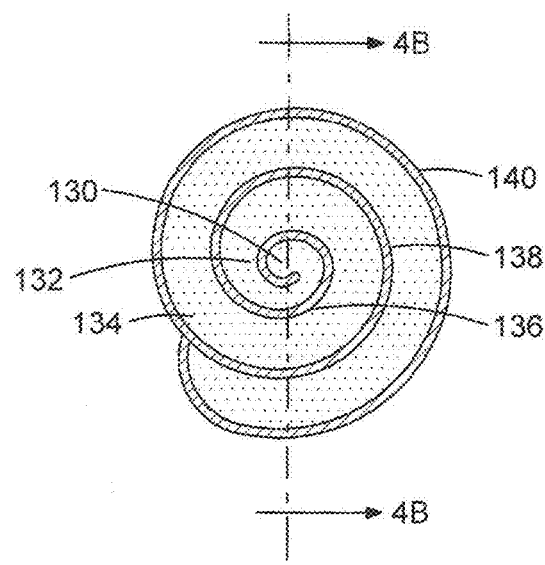
FIGS. 4A and 4B show an axial and longitudinal cross-sections of another tubular shaped layered food component having a rolled construction.
Figure 4B:
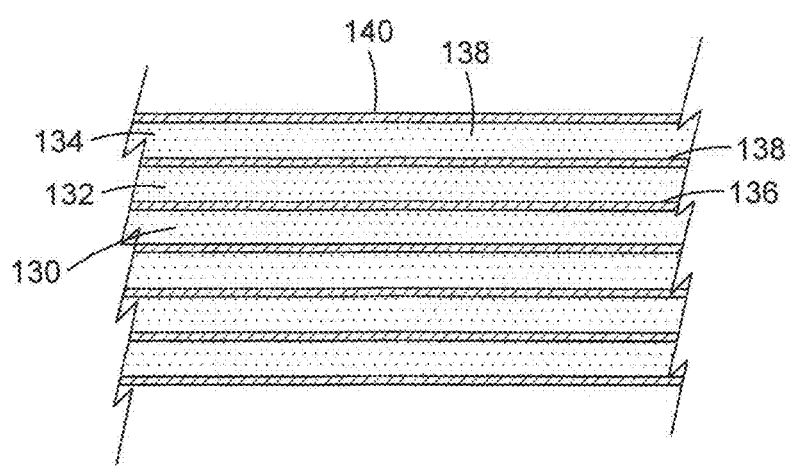

Still further, the present invention contemplates layered meat analog food components wherein more than two adjacent filler dough layers, which can comprise either a fat or meat mimic, or an interspersed blend of each, are separated by plant-based hydrocolloid films. FIGS. 4A and 4B depict a layered food component wherein an elongated tubular-shaped meat analog food component similar to that shown in FIGS. 3A and 3B but has at least three layers of a filler dough of a plant or animal-based material, which can comprise either a fat or meat mimic, or an interspersed blend of each, namely spiral layers 130, 132, and 134 separated by spiral internal hydrocolloid films 136 and 138 and are constrained by an external hydrocolloid film 140. It is contemplated that the layered meat analog food component 130 can be fabricated by rolling a pre-formed continuous sheet of filler dough, which can comprise either a fat or meat mimic, or an interspersed blend of each, together with a continuous hydrocolloid film to form the internal layered structure and then extending the film (without the filler dough), to constitute the member-constraining external hydrocolloid film 140.

Figure 5A:
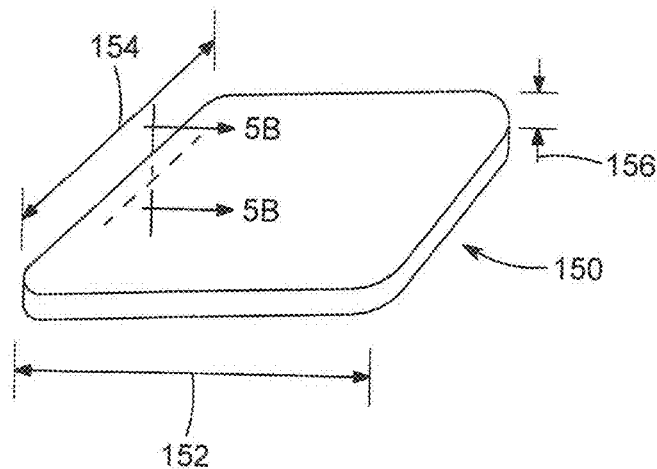
Figure 5B:
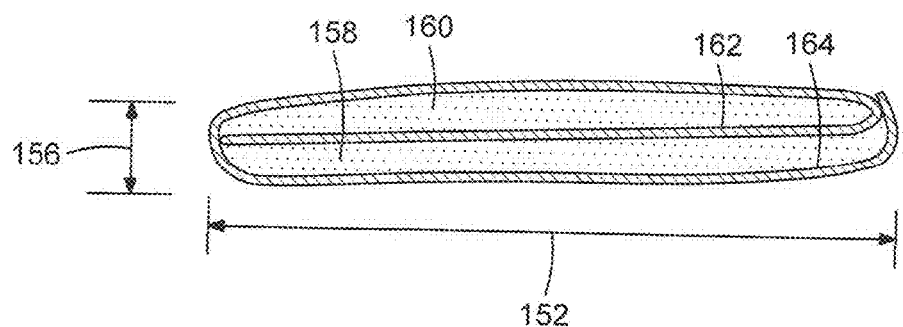

A further embodiment of the present meat analog layered food component invention is depicted in FIGS. 5A and 5B which show a meat analog layered food component 150 having a plate-like, generally planar shape, that is, wherein the length 152 and width 154 are both substantially greater than the component thickness 156. In an embodiment, it is expected that a plurality of meat analog layered food component 150 can advantageously be assembled into a finished meat analog food product to mimic animal meat musculature such as fish filets which when cooked by heat or chemicals will easily separate into large flakes as alluded to above in relation to FIG. 1B. Such fish types comprise salmon, haddock, cod, tilapia, catfish, trout, bass, etc. In an embodiment, the cross section in FIG. 5B, layered meat analog food component 150 comprises at least two internal layers 158 and 160 of filler dough material, which can comprise either a fat or meat mimic, or an interspersed blend of each, separated by a planar, plant-based hydrocolloid film 162. Meat analog layered food component 150 further comprises an outer, planar, plant-based hydrocolloid film 164 surrounding the internal filler dough layers 158, 160, and hydrocolloid layer 162. As in the previously described elongated, meat analog layered food component 110 shown in FIGS. 2A and 2B, the inner planar hydrocolloid film 162 and the outer planar hydrocolloid film 164 can be sections of a folded continuous film, or separate films. Similarly, the filler dough layers 158 and 160 can be of the same or different materials and can be pre-formed sheets or paste.

Figure 6:
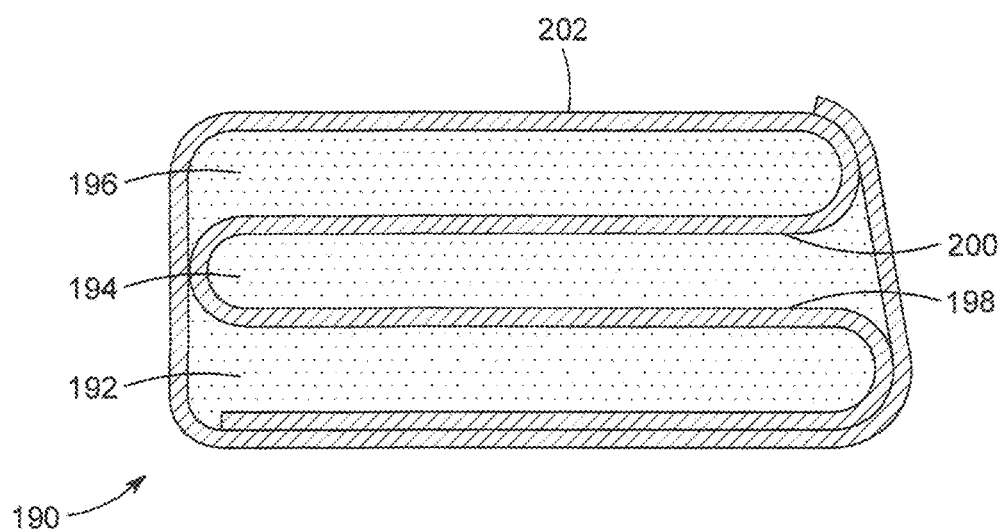
FIG. 6 shows a cross-sectional view of a planar layered food component having a folded construction.

Further, and in another embodiment, as depicted in FIG. 6B, planar meat analog layered food component 190 has three planar, filler dough layers 192, 194, and 196 separated by plant-based hydrocolloid films 198, and 200. The meat analog layered food component 190 has a further outside planar plant-based hydrocolloid film 202. Hydrocolloid films 198, 200, and 202 may be separate films or sections of a continuous film. The respective ends and edges of both tubular and planar meat analog layered food components 110, 130, 150 and 190 may be tapered to better conform to adjacent or partially overlapping components when assembled into a finished meat analog layered food product such as shown in FIGS. 1A-10. Also, free ends and edges may be sealed such as by local heating to better retain liquid (oil, water) constituents.

Figure 7A:
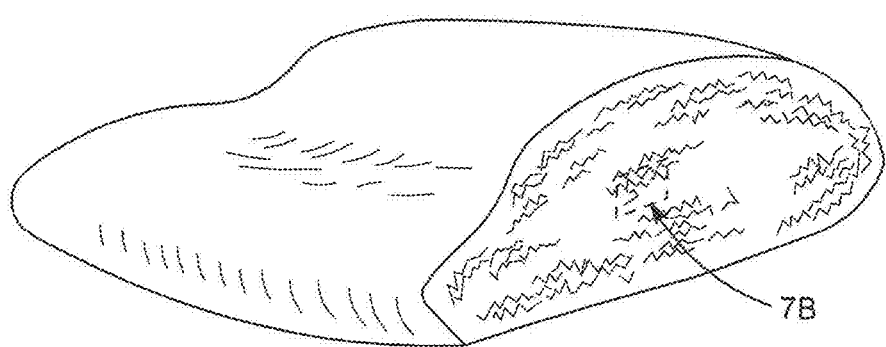
FIGS. 7A and 7B show a perspective view and a cross sectional view of a planar layered food product with the hydrocolloid films having a corrugated shape.
Figure 7B:
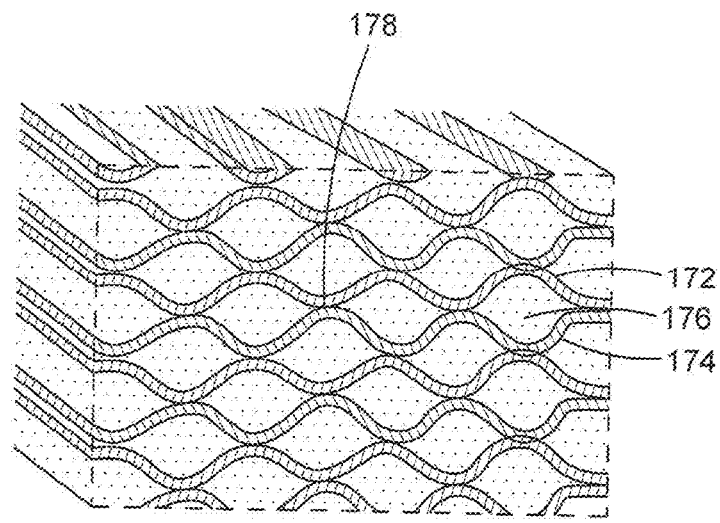

The present invention also relates to an embodiment of meat analog food product 170 as depicted in FIG. 7A, of a layered meat analog food product resembling a boneless skinless chicken breast, with thinly layered hydrocolloid films (as depicted in this embodiment of the crosscut by squiggly lines) such that the spacing between layers approximates the diameter of muscle fibers bundles. The cross section shown in FIG. 7B shows that hydrocolloid films 172 and 174 are layered in a corrugated fashion and are touching at point 178, creating elongated tubes with a characteristic length and diameter of chicken muscle fibers.

Another embodiment depicted in FIG. 8 relates to a meat analog food product component 220 imitating bundled muscle tissue fibers. In this embodiment, the hydrocolloid films 222, 224, and 226 imitate the structure and function of the sheath of fibrous elastic tissue surrounding a muscle (e.g. the epimysium, perimysium, and endomysium, respectively). Individual tubular dough layers 228, in the shape of muscle fibers, are enveloped by hydrocolloid films 226. A plurality of tubular layers are bundled together by hydrocolloid film 224, and the larger bundles formed by film 224 again assembled and held into an even larger tubular structure by hydrocolloid film 222. Interstitial areas 230 and 232 may be filled with a meat-like or fat-like filler dough or may be unfilled (e.g. the hydrocolloid films are directly adjacent to the surrounding films).

It is intended that the term "layered food component" is meant to comprise constructions where a hydrocolloid film separates and defines surfaces on two or more adjacent dough layer portions when viewed in representative axial or longitudinal cross-sectional views of the food component, such as spiral and folded configurations.

In an embodiment, hydrocolloid films separating dough layers, which can comprise either a fat or meat mimic, or an interspersed blend of each, are fused together in locations where they touch and connect. In an embodiment, the fusion can be gelling.

In an embodiment, hydrocolloid films separating dough layers contain oils or fats entrapped as droplets in the hydrocolloid gel matrix. In an embodiment, the hydrocolloid film is formed by the setting of an oil-in-hydrocolloid emulsion.

In an embodiment, a whole cut meat analog is a bacon. With regard to a bacon, it is commonly associated with a textural and sensorial feel of the bacon is its crispiness. Thus, in an embodiment, a meat analog bacon has a textural and sensorial feel of a bacon derived or from an animal.

Crispiness is a distinctive attribute of some foods, including bacon. Crispiness is commonly associated with a pleasing sensory feel to the individual consuming the food, including bacon. Sensory, mechanical, and acoustic data have been used by researchers to measure and define the properties of what makes foods such as bacon crispy. This data is capable of distinguishing crispy foods from crunchy foods by the pitch of the sound made. As the pitch and loudness of the sound increases, so does the perception of crispiness.

The sound of crispy foods is perceived by the consumer from multiple sources: sound that travels through the air, sound that travels through the soft tissues of the mouth, and sound that travels through the jawbone to the ears. To be easily perceived, bone-mediated sound and air-mediated sound must be propagated at 160 Hz. Crispiness is usually determined by the act of biting, whereas crunchiness is generally determined by chewing with the molars.

Oil content is also an important factor in crispiness. Fried foods produce a pleasing crispy texture owing to the sound made by the reflection of sound at the oil-air interface. Therefore, in an embodiment it is an advantage that a plant-based meat analog food product, including a plant-based meat analog bacon, be comprised of an oil and/or water (moisture) content that results in a crispy textural and sensorial feel.

Water contained in hydrocolloid gels can be bound in different forms, either weakly bound or strongly bound. Hydrocolloid gels can also contain non-bound free water. The amount of water in a hydrocolloid gel can affect its pore structure, diffusion behavior of water and solutes, and sorption and permeation behavior.

Water activity is a measure of free or unbound water in a food product. As such, the water activity of a hydrocolloid gel may influence its physical properties and thus its cooking behavior, including its melting temperature. High water activity in a hydrocolloid gel may be used as an indicator of the amount of unbound water in the gel.

In food applications, typical formulations for agar gel specify that agar should be added to water at 0.5% to 2% by weight. Agar gels have a melting temperature of 185° F. Because a hot skillet at medium heat is about 300° F. to 400° F., a plant-based meat made with an agar gel made at the recommended percent composition will liquefy and melt in the pan if it is cooked like an animal meat product.

One novel aspect of the present invention is the use of dehydration of an oil-in-hydrocolloid oleogel to reduce the moisture level to a point where the gel will not melt on a hot skillet. When the gel contains an oil interspersed within a hydrocolloid gel matrix, the invention simulates animal fat in appearance, texture, and cooking behavior. In this way, the invention solves a key challenge to reproducing the ability of many animal fats to retain a solid and cohesive form at typical cooking temperatures, without the use of methylcellulose. This effect could be the result of the driving off of unbound or weakly-bound water in the hydrocolloid matrix, but the present invention is not intended to be bound by this possible explanation, but only by the appended claims and their equivalents. Because salt and sugar bind to free water, their presence as solutes in the hydrocolloid gel will also affect cooking behavior. Salt, for example, increases the melting temperature of an agar gel. It has also been observed that the thickness of the gel, concentration of solutes, and surface topography of the gel can also influence the melting behavior when heated on a skillet.

In an embodiment of the present invention, a hydrocolloid film, including a film formed by an oil-in-hydrocolloid gel, is partially or fully dehydrated on the outside of a food product to resist melting and contain oils while cooking, while inner film layers contain higher levels of moisture that may or may not melt upon cooking.

Dehydration of a hydrocolloid film can change its mechanical properties, including tensile strength and melting behavior. In an embodiment of the present invention, a hydrocolloid film, including a film made by an oil-in-hydrocolloid gel, is partially or fully dehydrated before combining with dough layers.

In an embodiment, the oil-in-hydrocolloid gel used in an animal fat analog may be hydrated or dehydrated to a target moisture level where it melts upon cooking, and where the viscosity and appearance of the melted substance when hot and/or when cold is similar to the viscosity and appearance of melted animal fat when hot and/or when cold (i.e. congealed).

In an embodiment, the oil-in-hydrocolloid gel used in an animal fat analog may be dehydrated to a target moisture level where it does not melt upon cooking.

Another novel aspect of the present invention is the crispiness that dehydration imparts on the plant-based animal fat analog previously described. Before dehydration, the hydrocolloid gel containing oil is soft and little to no sound is produced when a consumer bites into the fat analog. The pre-cooking dehydration process changes the texture of the product so that it emits an increasingly loud and crispy sound with decreasing moisture content. The improvement in crispiness of the dehydrated product is achieved by a combination of the dehydration process and oil droplet size and can be used to make a product that is crispy in both an uncooked and/or cooked state, or to make a product that simulates the crispiness of an already cooked product without the need for cooking.

The size of droplets in an emulsion have a strong influence on the rheology, appearance, and stability of an emulsion. For example, the creaming stability (i.e. the resistance to phase separation) of an emulsion decreases with increasing droplet size (i.e. larger size droplets will quickly separate). An inventive aspect of the present invention is the use of a hydrocolloid gelling agent in the aqueous phase to trap larger oil droplets via gelation and thereby preserve their size and structure in the final food product. The ability to maintain droplet sizes within the hydrocolloid gel matrix that are best suited to produce crispy sound and texture is enabled, in an embodiment, by mixing oil into an aqueous hydrocolloid solution at low shear to produce large droplet sizes. The "poorly homogenized" emulsion thus formed is quickly cooled and set into a gel. Using this method, the optimal droplet size, once achieved, can be rapidly stabilized by gelation.

In an embodiment, dehydration and oil droplet size are designed to create a crispy meat analog, for example a crispy bacon meat.

In an embodiment of the present invention, the size of oil droplets within the hydrocolloid gel matrix is tuned to produce a target pitch and loudness that matches the sound of an animal fat when eaten.

In an embodiment of the present invention, the size of oil droplets within the hydrocolloid gel matrix is controlled by a mixing speed and/or shear force that is different from the shear force and/or mixing speed used to mix in other ingredients.

In an embodiment, the size of oil droplets within the hydrocolloid gel matrix creates a rough surface texture after dehydration resembling the surface texture of the meat portion or a fat portion of an animal meat, including a bacon.

In an embodiment, the size of oil droplets in the matrix formed by the oil-in-hydrocolloid gel is about the same size as individual segments of muscle fibers in a whole cut meat product, and upon dehydration, creates a segmentation pattern in the meat portion or the fat portion resembling the animal meat product.

In an embodiment, the segmentation of the meat or fat analog creates a tearing behavior in the meat or fat portions that is similar to the visual appearance and/or tensile strength of real animal meat or fat when torn.

In an embodiment, the animal fat analog resembles a dairy cheese.

In an embodiment, the animal fat analog resembles a cooked egg yolk or cooked egg white.

In an embodiment, the animal meat analog resembles a jerky.

In an embodiment of the present invention, a bacon analog is produced by combining two or more hydrocolloid gels resembling a fat analog, which is generally translucent in appearance and a meat analog, which generally has a reddish tint, into a bacon pattern with striping between a translucent fat analog and a reddish meat analog. The two portions are arranged and composed so that upon dehydration, the dehydrated pieces deform in such a way as to resemble the characteristic ripples of cooked animal bacon, for instance bacon obtained from a pig.

In an embodiment, the composite formed by the two portions may be cut into strips in such a way and pattern as to promote the formation of ripples during the deformation caused by the dehydration process.

In an embodiment, one or more of the meat or fat portions of the composite are molded or imprinted with a pattern that increases the resemblance of the bacon analog surface texture to animal bacon either before or after dehydration, or before or after cooking.

In an embodiment, a plant-based animal analog has a crispiness of at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99% or at least 100% of an animal derived, sourced and/or based bacon.

In an embodiment, a plant-based animal analog has a crispiness of about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99% or about 100% of an animal derived, sourced and/or based bacon.

In an embodiment, a plant-based animal analog has a crispiness of no more than 1%, no more than 2%, no more than 3%, no more than 4%, no more than 5%, no more than 6%, no more than 7%, no more than 8%, no more than 9%, no more than 10%, no more than 11%, no more than 12%, no more than 13%, no more than 14%, no more than 15%, no more than 16%, no more than 17%, no more than 18%, no more than 19%, no more than 20%, no more than 21%, no more than 22%, no more than 23%, no more than 24%, no more than 25%, no more than 26%, no more than 27%, no more than 28%, no more than 29%, no more than 30%, no more than 31%, no more than 32%, no more than 33%, no more than 34%, no more than 35%, no more than 36%, no more than 37%, no more than 38%, no more than 39%, no more than 40%, no more than 41%, no more than 42%, no more than 43%, no more than 44%, no more than 45%, no more than 46%, no more than 47%, no more than 48%, no more than 49%, no more than 50%, no more than 51%, no more than 52%, no more than 53%, no more than 54%, no more than 55%, no more than 56%, no more than 57%, no more than 58%, no more than 59%, no more than 60%, no more than 61%, no more than 62%, no more than 63%, no more than 64%, no more than 65%, no more than 66%, no more than 67%, no more than 68%, no more than 69%, no more than 70%, no more than 71%, no more than 72%, no more than 73%, no more than 74%, no more than 75%, no more than 76%, no more than 77%, no more than 78%, no more than 79%, no more than 80%, no more than 81%, no more than 82%, no more than 83%, no more than 84%, no more than 85%, no more than 86%, no more than 87%, no more than 88%, no more than 89%, no more than 90%, no more than 91%, no more than 92%, no more than 93%, no more than 94%, no more than 95%, no more than 96%, no more than 97%, no more than 98%, no more than 99% or no more than 100% of an animal derived, sourced and/or based bacon.

In an embodiment, a plant-based animal analog has agar at a concentration of at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29% or at least 30% or more w/w of the plant-based analog.

In an embodiment, a plant-based animal analog has agar at a concentration of about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30% or more w/w of the plant-based analog.

In an embodiment, a plant-based animal analog has a agar at a concentration of no more than 1%, no more than 2%, no more than 3%, no more than 4%, no more than 5%, no more than 6%, no more than 7%, no more than 8%, no more than 9%, no more than 10%, no more than 11%, no more than 12%, no more than 13%, no more than 14%, no more than 15%, no more than 16%, no more than 17%, no more than 18%, no more than 19%, no more than 20%, no more than 21%, no more than 22%, no more than 23%, no more than 24%, no more than 25%, no more than 26%, no more than 27%, no more than 28%, no more than 29%, no more than 30% or more w/w of the plant-based analog.

In an embodiment, a plant-based animal analog has Protein at a concentration of at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29% or at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79% or at least 80% or more w/w of the plant-based analog.

In an embodiment, a plant-based animal analog has a protein at a concentration of about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, or more w/w of the plant-based analog.

In an embodiment, a plant-based animal analog has a protein at a concentration of no more than 1%, no more than 2%, no more than 3%, no more than 4%, no more than 5%, no more than 6%, no more than 7%, no more than 8%, no more than 9%, no more than 10%, no more than 11%, no more than 12%, no more than 13%, no more than 14%, no more than 15%, no more than 16%, no more than 17%, no more than 18%, no more than 19%, no more than 20%, no more than 21%, no more than 22%, no more than 23%, no more than 24%, no more than 25%, no more than 26%, no more than 27%, no more than 28%, no more than 29%, no more than 30%, no more than 31%, no more than 32%, no more than 33%, no more than 34%, no more than 35%, no more than 36%, no more than 37%, no more than 38%, no more than 39%, no more than 40%, no more than 41%, no more than 42%, no more than 43%, no more than 44%, no more than 45%, no more than 46%, no more than 47%, no more than 48%, no more than 49%, no more than 50%, no more than 51%, no more than 52%, no more than 53%, no more than 54%, no more than 55%, no more than 56%, no more than 57%, no more than 58%, no more than 59%, no more than 60%, no more than 61%, no more than 62%, no more than 63%, no more than 64%, no more than 65%, no more than 66%, no more than 67%, no more than 68%, no more than 69%, no more than 70%, no more than 71%, no more than 72%, no more than 73%, no more than 74%, no more than 75%, no more than 76%, no more than 77%, no more than 78%, no more than 79%, no more than 80% or more w/w/ of the plant-based analog.

In an embodiment, a plant-based animal analog has a carbohydrate at a concentration of at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29% or at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49% or at least 50% or more w/w of the plant-based analog.

In an embodiment, a plant-based animal analog has a carbohydrate at a concentration of about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, or more w/w of the plant-based analog.

In an embodiment, a plant-based animal analog has a carbohydrate at a concentration of no more than 1%, no more than 2%, no more than 3%, no more than 4%, no more than 5%, no more than 6%, no more than 7%, no more than 8%, no more than 9%, no more than 10%, no more than 11%, no more than 12%, no more than 13%, no more than 14%, no more than 15%, no more than 16%, no more than 17%, no more than 18%, no more than 19%, no more than 20%, no more than 21%, no more than 22%, no more than 23%, no more than 24%, no more than 25%, no more than 26%, no more than 27%, no more than 28%, no more than 29%, no more than 30%, no more than 31%, no more than 32%, no more than 33%, no more than 34%, no more than 35%, no more than 36%, no more than 37%, no more than 38%, no more than 39%, no more than 40%, no more than 41%, no more than 42%, no more than 43%, no more than 44%, no more than 45%, no more than 46%, no more than 47%, no more than 48%, no more than 49%, no more than 50% or more w/w of the plant-based analog.

In an embodiment, a plant-based animal analog has an oil at a concentration of at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29% or at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94% or at least 95% or more w/w of the plant-based analog.

In an embodiment, a plant-based animal analog has an oil at a concentration of about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95% or more w/w of the plant-based analog.

In an embodiment, a plant-based animal analog has an oil at a concentration of no more than 1%, no more than 2%, no more than 3%, no more than 4%, no more than 5%, no more than 6%, no more than 7%, no more than 8%, no more than 9%, no more than 10%, no more than 11%, no more than 12%, no more than 13%, no more than 14%, no more than 15%, no more than 16%, no more than 17%, no more than 18%, no more than 19%, no more than 20%, no more than 21%, no more than 22%, no more than 23%, no more than 24%, no more than 25%, no more than 26%, no more than 27%, no more than 28%, no more than 29%, no more than 30%, no more than 31%, no more than 32%, no more than 33%, no more than 34%, no more than 35%, no more than 36%, no more than 37%, no more than 38%, no more than 39%, no more than 40%, no more than 41%, no more than 42%, no more than 43%, no more than 44%, no more than 45%, no more than 46%, no more than 47%, no more than 48%, no more than 49%, no more than 50%, no more than 51%, no more than 52%, no more than 53%, no more than 54%, no more than 55%, no more than 56%, no more than 57%, no more than 58%, no more than 59%, no more than 60%, no more than 61%, no more than 62%, no more than 63%, no more than 64%, no more than 65%, no more than 66%, no more than 67%, no more than 68%, no more than 69%, no more than 70%, no more than 71%, no more than 72%, no more than 73%, no more than 74%, no more than 75%, no more than 76%, no more than 77%, no more than 78%, no more than 79%, no more than 80%, no more than 81%, no more than 82%, no more than 83%, no more than 84%, no more than 85%, no more than 86%, no more than 87%, no more than 88%, no more than 89%, no more than 90%, no more than 91%, no more than 92%, no more than 93%, no more than 94%, no more than 95% or more w/w of the plant-based analog.

In an embodiment, a plant-based animal analog has water at a concentration of at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29% or at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99% or more w/w of the plant-based analog.

In an embodiment, a plant-based animal analog has a water concentration of about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99% or more w/w of the plant-based analog.

In an embodiment, a plant-based animal analog has a water concentration of no more than 1%, no more than 2%, no more than 3%, no more than 4%, no more than 5%, no more than 6%, no more than 7%, no more than 8%, no more than 9%, no more than 10%, no more than 11%, no more than 12%, no more than 13%, no more than 14%, no more than 15%, no more than 16%, no more than 17%, no more than 18%, no more than 19%, no more than 20%, no more than 21%, no more than 22%, no more than 23%, no more than 24%, no more than 25%, no more than 26%, no more than 27%, no more than 28%, no more than 29%, no more than 30%, no more than 31%, no more than 32%, no more than 33%, no more than 34%, no more than 35%, no more than 36%, no more than 37%, no more than 38%, no more than 39%, no more than 40%, no more than 41%, no more than 42%, no more than 43%, no more than 44%, no more than 45%, no more than 46%, no more than 47%, no more than 48%, no more than 49%, no more than 50%, no more than 51%, no more than 52%, no more than 53%, no more than 54%, no more than 55%, no more than 56%, no more than 57%, no more than 58%, no more than 59%, no more than 60%, no more than 61%, no more than 62%, no more than 63%, no more than 64%, no more than 65%, no more than 66%, no more than 67%, no more than 68%, no more than 69%, no more than 70%, no more than 71%, no more than 72%, no more than 73%, no more than 74%, no more than 75%, no more than 76%, no more than 77%, no more than 78%, no more than 79%, no more than 80%, no more than 81%, no more than 82%, no more than 83%, no more than 84%, no more than 85%, no more than 86%, no more than 87%, no more than 88%, no more than 89%, no more than 90%, no more than 91%, no more than 92%, no more than 93%, no more than 94%, no more than 95%, no more than 96%, no more than 97%, no more than 98%, no more than 99% or more w/w of the plant-based analog.

In an embodiment, the size of oil droplets inside the hydrocolloid-based gel have a diameter of about 0.01 mm, about 0.02 mm, about 0.03 mm, about 0.04 mm, about 0.05 mm, about 0.06 mm, about 0.07 mm, about 0.08 mm, about 0.09 mm, about 0.10 mm, about 0.20 mm, about 0.30 mm, about 0.40 mm, about 0.50 mm, about 0.60 mm, about 0.70 mm, about 0.80 mm, about 0.90 mm, about 1.0 mm, about 1.1 mm, about 1.2 mm, about 1.3 mm, about 1.4 mm, about 1.5 mm or larger.

In an embodiment, the size of oil droplets inside the hydrocolloid-based gel have a diameter of no more than 0.01 mm, no more than 0.02 mm, no more than 0.03 mm, no more than 0.04 mm, no more than 0.05 mm, no more than 0.06 mm, no more than 0.07 mm, no more than 0.08 mm, no more than 0.09 mm, no more than 0.10 mm, no more than 0.20 mm, no more than 0.30 mm, no more than 0.40 mm, no more than 0.50 mm, no more than 0.60 mm, no more than 0.70 mm, no more than 0.80 mm, no more than 0.90 mm, no more than 1.0 mm, no more than 1.1 mm, no more than 1.2 mm, no more than 1.3 mm, no more than 1.4 mm, no more than 1.5 mm or larger.

In an embodiment, the size of oil droplets inside the hydrocolloid-based gel have a diameter of at least 0.01 mm, at least 0.02 mm, at least 0.03 mm, at least 0.04 mm, at least 0.05 mm, at least 0.06 mm, at least 0.07 mm, at least 0.08 mm, at least 0.09 mm, at least 0.10 mm, at least 0.20 mm, at least 0.30 mm, at least 0.40 mm, at least 0.50 mm, at least 0.60 mm, at least 0.70 mm, at least 0.80 mm, at least 0.90 mm, at least 1.0 mm, at least 1.1 mm, at least 1.2 mm, at least 1.3 mm, at least 1.4 mm, at least 1.5 mm or larger.

In an embodiment, the structural rigidity of a plant-based meat analog is increased by at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99% or at least 100% of an animal derived, sourced and/or based bacon.

In an embodiment, the structural rigidity of a plant-based meat analog is increased by about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99% or about 100% of an animal derived, sourced and/or based bacon.

In an embodiment, the structural rigidity of a plant-based meat analog is increased no more than 1%, no more than 2%, no more than 3%, no more than 4%, no more than 5%, no more than 6%, no more than 7%, no more than 8%, no more than 9%, no more than 10%, no more than 11%, no more than 12%, no more than 13%, no more than 14%, no more than 15%, no more than 16%, no more than 17%, no more than 18%, no more than 19%, no more than 20%, no more than 21%, no more than 22%, no more than 23%, no more than 24%, no more than 25%, no more than 26%, no more than 27%, no more than 28%, no more than 29%, no more than 30%, no more than 31%, no more than 32%, no more than 33%, no more than 34%, no more than 35%, no more than 36%, no more than 37%, no more than 38%, no more than 39%, no more than 40%, no more than 41%, no more than 42%, no more than 43%, no more than 44%, no more than 45%, no more than 46%, no more than 47%, no more than 48%, no more than 49%, no more than 50%, no more than 51%, no more than 52%, no more than 53%, no more than 54%, no more than 55%, no more than 56%, no more than 57%, no more than 58%, no more than 59%, no more than 60%, no more than 61%, no more than 62%, no more than 63%, no more than 64%, no more than 65%, no more than 66%, no more than 67%, no more than 68%, no more than 69%, no more than 70%, no more than 71%, no more than 72%, no more than 73%, no more than 74%, no more than 75%, no more than 76%, no more than 77%, no more than 78%, no more than 79%, no more than 80%, no more than 81%, no more than 82%, no more than 83%, no more than 84%, no more than 85%, no more than 86%, no more than 87%, no more than 88%, no more than 89%, no more than 90%, no more than 91%, no more than 92%, no more than 93%, no more than 94%, no more than 95%, no more than 96%, no more than 97%, no more than 98%, no more than 99% or no more than 100% of an animal derived, sourced and/or based bacon.

In another embodiment, the improvement in crispiness, textural feel, sensorial feel and/or rigidity of a plant-based meat analog increases the plant-based meat analog similarity to animal meat, including bacon, by at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99% or at least 100%.

In another embodiment, the improvement in crispiness, textural feel, sensorial feel and/or rigidity of a plant-based meat analog increases the plant-based meat analog similarity to animal meat, including bacon, by about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99% or about 100%.

In another embodiment, the improvement in crispiness, textural feel, sensorial feel and/or rigidity of a plant-based meat analog increases the plant-based meat analog similarity to animal meat, including bacon, by no more than 1%, no more than 2%, no more than 3%, no more than 4%, no more than 5%, no more than 6%, no more than 7%, no more than 8%, no more than 9%, no more than 10%, no more than 11%, no more than 12%, no more than 13%, no more than 14%, no more than 15%, no more than 16%, no more than 17%, no more than 18%, no more than 19%, no more than 20%, no more than 21%, no more than 22%, no more than 23%, no more than 24%, no more than 25%, no more than 26%, no more than 27%, no more than 28%, no more than 29%, no more than 30%, no more than 31%, no more than 32%, no more than 33%, no more than 34%, no more than 35%, no more than 36%, no more than 37%, no more than 38%, no more than 39%, no more than 40%, no more than 41%, no more than 42%, no more than 43%, no more than 44%, no more than 45%, no more than 46%, no more than 47%, no more than 48%, no more than 49%, no more than 50%, no more than 51%, no more than 52%, no more than 53%, no more than 54%, no more than 55%, no more than 56%, no more than 57%, no more than 58%, no more than 59%, no more than 60%, no more than 61%, no more than 62%, no more than 63%, no more than 64%, no more than 65%, no more than 66%, no more than 67%, no more than 68%, no more than 69%, no more than 70%, no more than 71%, no more than 72%, no more than 73%, no more than 74%, no more than 75%, no more than 76%, no more than 77%, no more than 78%, no more than 79%, no more than 80%, no more than 81%, no more than 82%, no more than 83%, no more than 84%, no more than 85%, no more than 86%, no more than 87%, no more than 88%, no more than 89%, no more than 90%, no more than 91%, no more than 92%, no more than 93%, no more than 94%, no more than 95%, no more than 96%, no more than 97%, no more than 98%, no more than 99% or no more than 100%.

In an embodiment, a protein-based meat analog is comprised of a meat-like dough that is comprised of 1% to 90%, 0.1% to 1%, 0.2% to 1%, 0.3% to 1%, 0.4% to 1%, 0.5% to 1%, 0.6% to 1%, 0.7% to 1%, 0.8% to 1%, 0.9% to 1%, 0.1% to 2, 0.5% to 2.5%, 1% to 5%, 2% to 25%, 3% to 20%, 5% to 50%, 4% to 40%, 3% to 10%, 1% to 3%, 0.1% to 2% or any other combination of concentrations between about 1% to about 90% of a polysaccharide and/or a carbohydrate, about 1% to about 90% of a protein, and about 1% to 70% of an oil.

In an embodiment of the present invention, a hydrocolloid comprises a carbohydrate at a concentration of at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99% or at least 100%.

In an embodiment of the present invention, a hydrocolloid comprises a carbohydrate at a concentration of by about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99% or about 100%.

In an embodiment of the present invention, a hydrocolloid comprises a carbohydrate at a concentration of by no more than 1%, no more than 2%, no more than 3%, no more than 4%, no more than 5%, no more than 6%, no more than 7%, no more than 8%, no more than 9%, no more than 10%, no more than 11%, no more than 12%, no more than 13%, no more than 14%, no more than 15%, no more than 16%, no more than 17%, no more than 18%, no more than 19%, no more than 20%, no more than 21%, no more than 22%, no more than 23%, no more than 24%, no more than 25%, no more than 26%, no more than 27%, no more than 28%, no more than 29%, no more than 30%, no more than 31%, no more than 32%, no more than 33%, no more than 34%, no more than 35%, no more than 36%, no more than 37%, no more than 38%, no more than 39%, no more than 40%, no more than 41%, no more than 42%, no more than 43%, no more than 44%, no more than 45%, no more than 46%, no more than 47%, no more than 48%, no more than 49%, no more than 50%, no more than 51%, no more than 52%, no more than 53%, no more than 54%, no more than 55%, no more than 56%, no more than 57%, no more than 58%, no more than 59%, no more than 60%, no more than 61%, no more than 62%, no more than 63%, no more than 64%, no more than 65%, no more than 66%, no more than 67%, no more than 68%, no more than 69%, no more than 70%, no more than 71%, no more than 72%, no more than 73%, no more than 74%, no more than 75%, no more than 76%, no more than 77%, no more than 78%, no more than 79%, no more than 80%, no more than 81%, no more than 82%, no more than 83%, no more than 84%, no more than 85%, no more than 86%, no more than 87%, no more than 88%, no more than 89%, no more than 90%, no more than 91%, no more than 92%, no more than 93%, no more than 94%, no more than 95%, no more than 96%, no more than 97%, no more than 98%, no more than 99% or no more than 100%.

In an embodiment of the present invention, a hydrocolloid comprises an oil at a concentration of at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99% or at least 100%.

In an embodiment of the present invention, a hydrocolloid comprises an oil at a concentration of by about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99% or about 100%.

In an embodiment of the present invention, a hydrocolloid comprises an oil at a concentration of by no more than 1%, no more than 2%, no more than 3%, no more than 4%, no more than 5%, no more than 6%, no more than 7%, no more than 8%, no more than 9%, no more than 10%, no more than 11%, no more than 12%, no more than 13%, no more than 14%, no more than 15%, no more than 16%, no more than 17%, no more than 18%, no more than 19%, no more than 20%, no more than 21%, no more than 22%, no more than 23%, no more than 24%, no more than 25%, no more than 26%, no more than 27%, no more than 28%, no more than 29%, no more than 30%, no more than 31%, no more than 32%, no more than 33%, no more than 34%, no more than 35%, no more than 36%, no more than 37%, no more than 38%, no more than 39%, no more than 40%, no more than 41%, no more than 42%, no more than 43%, no more than 44%, no more than 45%, no more than 46%, no more than 47%, no more than 48%, no more than 49%, no more than 50%, no more than 51%, no more than 52%, no more than 53%, no more than 54%, no more than 55%, no more than 56%, no more than 57%, no more than 58%, no more than 59%, no more than 60%, no more than 61%, no more than 62%, no more than 63%, no more than 64%, no more than 65%, no more than 66%, no more than 67%, no more than 68%, no more than 69%, no more than 70%, no more than 71%, no more than 72%, no more than 73%, no more than 74%, no more than 75%, no more than 76%, no more than 77%, no more than 78%, no more than 79%, no more than 80%, no more than 81%, no more than 82%, no more than 83%, no more than 84%, no more than 85%, no more than 86%, no more than 87%, no more than 88%, no more than 89%, no more than 90%, no more than 91%, no more than 92%, no more than 93%, no more than 94%, no more than 95%, no more than 96%, no more than 97%, no more than 98%, no more than 99% or no more than 100%.

In an embodiment of the present invention, a hydrocolloid comprises a protein at a concentration of at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99% or at least 100%.

In an embodiment of the present invention, a hydrocolloid comprises a protein at a concentration of by about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99% or about 100%.

In an embodiment of the present invention, a hydrocolloid comprises a protein at a concentration of by no more than 1%, no more than 2%, no more than 3%, no more than 4%, no more than 5%, no more than 6%, no more than 7%, no more than 8%, no more than 9%, no more than 10%, no more than 11%, no more than 12%, no more than 13%, no more than 14%, no more than 15%, no more than 16%, no more than 17%, no more than 18%, no more than 19%, no more than 20%, no more than 21%, no more than 22%, no more than 23%, no more than 24%, no more than 25%, no more than 26%, no more than 27%, no more than 28%, no more than 29%, no more than 30%, no more than 31%, no more than 32%, no more than 33%, no more than 34%, no more than 35%, no more than 36%, no more than 37%, no more than 38%, no more than 39%, no more than 40%, no more than 41%, no more than 42%, no more than 43%, no more than 44%, no more than 45%, no more than 46%, no more than 47%, no more than 48%, no more than 49%, no more than 50%, no more than 51%, no more than 52%, no more than 53%, no more than 54%, no more than 55%, no more than 56%, no more than 57%, no more than 58%, no more than 59%, no more than 60%, no more than 61%, no more than 62%, no more than 63%, no more than 64%, no more than 65%, no more than 66%, no more than 67%, no more than 68%, no more than 69%, no more than 70%, no more than 71%, no more than 72%, no more than 73%, no more than 74%, no more than 75%, no more than 76%, no more than 77%, no more than 78%, no more than 79%, no more than 80%, no more than 81%, no more than 82%, no more than 83%, no more than 84%, no more than 85%, no more than 86%, no more than 87%, no more than 88%, no more than 89%, no more than 90%, no more than 91%, no more than 92%, no more than 93%, no more than 94%, no more than 95%, no more than 96%, no more than 97%, no more than 98%, no more than 99% or no more than 100%.

In an embodiment of the present invention, a hydrocolloid comprises a polysaccharide at a concentration of at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99% or at least 100%.

In an embodiment of the present invention, a hydrocolloid comprises a polysaccharide at a concentration of by about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99% or about 100%.

In an embodiment of the present invention, a hydrocolloid comprises a polysaccharide at a concentration of by no more than 1%, no more than 2%, no more than 3%, no more than 4%, no more than 5%, no more than 6%, no more than 7%, no more than 8%, no more than 9%, no more than 10%, no more than 11%, no more than 12%, no more than 13%, no more than 14%, no more than 15%, no more than 16%, no more than 17%, no more than 18%, no more than 19%, no more than 20%, no more than 21%, no more than 22%, no more than 23%, no more than 24%, no more than 25%, no more than 26%, no more than 27%, no more than 28%, no more than 29%, no more than 30%, no more than 31%, no more than 32%, no more than 33%, no more than 34%, no more than 35%, no more than 36%, no more than 37%, no more than 38%, no more than 39%, no more than 40%, no more than 41%, no more than 42%, no more than 43%, no more than 44%, no more than 45%, no more than 46%, no more than 47%, no more than 48%, no more than 49%, no more than 50%, no more than 51%, no more than 52%, no more than 53%, no more than 54%, no more than 55%, no more than 56%, no more than 57%, no more than 58%, no more than 59%, no more than 60%, no more than 61%, no more than 62%, no more than 63%, no more than 64%, no more than 65%, no more than 66%, no more than 67%, no more than 68%, no more than 69%, no more than 70%, no more than 71%, no more than 72%, no more than 73%, no more than 74%, no more than 75%, no more than 76%, no more than 77%, no more than 78%, no more than 79%, no more than 80%, no more than 81%, no more than 82%, no more than 83%, no more than 84%, no more than 85%, no more than 86%, no more than 87%, no more than 88%, no more than 89%, no more than 90%, no more than 91%, no more than 92%, no more than 93%, no more than 94%, no more than 95%, no more than 96%, no more than 97%, no more than 98%, no more than 99% or no more than 100%.

In another embodiment, the protein-based meat analog has a tensile strength that is at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99% or at least 100% of a comparable meat. In an embodiment a comparable meat is a bacon, a steak, a filet, a pork chop and a chicken breast from an animal.

In another embodiment, the protein-based meat analog has a tensile strength that is no more than 1%, no more than 2%, no more than 3%, no more than 4%, no more than 5%, no more than 6%, no more than 7%, no more than 8%, no more than 9%, no more than 10%, no more than 11%, no more than 12%, no more than 13%, no more than 14%, no more than 15%, no more than 16%, no more than 17%, no more than 18%, no more than 19%, no more than 20%, no more than 21%, no more than 22%, no more than 23%, no more than 24%, no more than 25%, no more than 26%, no more than 27%, no more than 28%, no more than 29%, no more than 30%, no more than 31%, no more than 32%, no more than 33%, no more than 34%, no more than 35%, no more than 36%, no more than 37%, no more than 38%, no more than 39%, no more than 40%, no more than 41%, no more than 42%, no more than 43%, no more than 44%, no more than 45%, no more than 46%, no more than 47%, no more than 48%, no more than 49%, no more than 50%, no more than 51%, no more than 52%, no more than 53%, no more than 54%, no more than 55%, no more than 56%, no more than 57%, no more than 58%, no more than 59%, no more than 60%, no more than 61%, no more than 62%, no more than 63%, no more than 64%, no more than 65%, no more than 66%, no more than 67%, no more than 68%, no more than 69%, no more than 70%, no more than 71%, no more than 72%, no more than 73%, no more than 74%, no more than 75%, no more than 76%, no more than 77%, no more than 78%, no more than 79%, no more than 80%, no more than 81%, no more than 82%, no more than 83%, no more than 84%, no more than 85%, no more than 86%, no more than 87%, no more than 88%, no more than 89%, no more than 90%, no more than 91%, no more than 92%, no more than 93%, no more than 94%, no more than 95%, no more than 96%, no more than 97%, no more than 98%, no more than 99% or no more than 100% of a comparable meat.

In another embodiment, the protein-based meat analog has a tensile strength that is about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99% or about 100% of a comparable meat.

In a further embodiment, a method of making a plant-based meat analog, can comprise (a) heating, including cooking a plant-based meat analog to a temperature ranging from 150.degree. F. to 250.degree. F. or to a temperature of about 150.degree. F, about 160.degree. F, about 170.degree. F, about 180.degree. F, about 190.degree. F, about 200.degree. F, about 210.degree. F, about 220.degree. F, about 230.degree. F, about 240.degree. F, about 250.degree. F, about 260.degree. F, about 270.degree. F, about 280.degree. F, about 290.degree. F, about 300.degree. F, about 310.degree. F, about 320.degree. F, about 330.degree. F, about 340.degree. F, about 350.degree. F, about 360.degree. F, about 370.degree. F, about 380.degree. F, about 390.degree. F, about 400.degree. F, about 410.degree. F, about 420.degree. F, about 430.degree. F, about 440.degree. F, about 450.degree. F, about 460.degree. F, about 470.degree. F, about 480.degree. F, about 490.degree. F or about 500.degree. F.

In another embodiment, the plant-based meat analog, including a plant-based bacon has a moisture content that is at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99% or at least 100% by weight.

In another embodiment, the plant-based meat analog, including a plant-based bacon has a moisture content that is about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99% or about 100% by weight.

In another embodiment, the plant-based meat analog, including a plant-based bacon has a moisture content that is no more than 1%, no more than 2%, no more than 3%, no more than 4%, no more than 5%, no more than 6%, no more than 7%, no more than 8%, no more than 9%, no more than 10%, no more than 11%, no more than 12%, no more than 13%, no more than 14%, no more than 15%, no more than 16%, no more than 17%, no more than 18%, no more than 19%, no more than 20%, no more than 21%, no more than 22%, no more than 23%, no more than 24%, no more than 25%, no more than 26%, no more than 27%, no more than 28%, no more than 29%, no more than 30%, no more than 31%, no more than 32%, no more than 33%, no more than 34%, no more than 35%, no more than 36%, no more than 37%, no more than 38%, no more than 39%, no more than 40%, no more than 41%, no more than 42%, no more than 43%, no more than 44%, no more than 45%, no more than 46%, no more than 47%, no more than 48%, no more than 49%, no more than 50%, no more than 51%, no more than 52%, no more than 53%, no more than 54%, no more than 55%, no more than 56%, no more than 57%, no more than 58%, no more than 59%, no more than 60%, no more than 61%, no more than 62%, no more than 63%, no more than 64%, no more than 65%, no more than 66%, no more than 67%, no more than 68%, no more than 69%, no more than 70%, no more than 71%, no more than 72%, no more than 73%, no more than 74%, no more than 75%, no more than 76%, no more than 77%, no more than 78%, no more than 79%, no more than 80%, no more than 81%, no more than 82%, no more than 83%, no more than 84%, no more than 85%, no more than 86%, no more than 87%, no more than 88%, no more than 89%, no more than 90%, no more than 91%, no more than 92%, no more than 93%, no more than 94%, no more than 95%, no more than 96%, no more than 97%, no more than 98%, no more than 99% or no more than 100% by weight.

The water activity of raw animal meat is typically between 0.97 and 0.99.

In another embodiment, the water activity level of a plant-based meat analog, including a plant-based bacon is at least 0, at least 0.1, at least 0.2, at least 0.3, at least 0.4, at least 0.5, at least 0.6, at least 0.7, at least 0.8, at least 0.9 or at least 1.0. In a further embodiment, the water activity level of a plant-based meat analog, including a plant-based bacon is about 0, about 0.1, about 0.2, about 0.3, about 0.4, about 0.5, about 0.6, about 0.7, about 0.8, about 0.9 or about 1.0. In another embodiment, the water activity level of a plant-based meat analog, including a plant-based bacon is no more than 0, no more than 0.1, no more than 0.2, no more than 0.3, no more than 0.4, no more than 0.5, no more than 0.6, no more than 0.7, no more than 0.8, no more than 0.9 or no more than 1.0.

In another embodiment, the plant-based meat analog, including a plant-based bacon has a salt concentration of about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24% or about 25% by weight.

In another embodiment, the plant-based meat analog, including a plant-based bacon has a salt concentration of at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24% or at least 25% by weight.

In another embodiment, the plant-based meat analog, including a plant-based bacon has a salt concentration of no more than 1%, no more than 2%, no more than 3%, no more than 4%, no more than 5%, no more than 6%, no more than 7%, no more than 8%, no more than 9%, no more than 10%, no more than 11%, no more than 12%, no more than 13%, no more than 14%, no more than 15%, no more than 16%, no more than 17%, no more than 18%, no more than 19%, no more than 20%, no more than 21%, no more than 22%, no more than 23%, no more than 24% or no more than 25% by weight.

In an embodiment, a plant-based meat analog is made to taste, feel, have the texture feel, sensory feel and/or look of meat from an animal by adjusting the pH using a pH adjusting agent. In an embodiment, the pH is of a plant-based meat analog is adjusted. In another embodiment, the pH of a meat analog is adjusted. It is known that beef has a pH of about 5.5. Therefore, in an embodiment, to make a plant-based meat analog to taste, feel, have the texture and/or color of beef, the pH of the plant-based meat analog can be made to be about 5.5. A pH adjusting agent may be organic or inorganic. In one embodiment, a pH adjusting agent comprises a salt, an ionic salt, an alkali metal, an alkaline earth metal, a monovalent or divalent cationic metals, hydroxides, carbonates, bicarbonates, chlorides, gluconates, acetates, sulfides, monovalent or divalent cationic metals (e.g. calcium, sodium, potassium, and magnesium). In a further embodiment, an acidic pH adjusting agents comprise acetic acid, hydrochloric acid, citric acid, succinic acid, and combinations thereof. In another embodiment, a basic pH adjusting agents comprise potassium bicarbonate, sodium bicarbonate, sodium hydroxide, potassium hydroxide, calcium hydroxide, ethanolamine, calcium bicarbonate, calcium hydroxide, ferrous hydroxide, lime, calcium carbonate, trisodium phosphate, and combinations thereof. In one embodiment, a pH adjusting agent is a food grade edible acid or food grade edible base. In an embodiment, lactic acid is used as the pH adjusting agent. Lactic acid is known to provide a fresh taste that includes a sourness that is associated with in beef.

Other pH adjusting agents can be used depending on the desired flavor, texture, color and feel of the plant-based meat analog. A pH adjusting agent can be used to bring the pH of the plant-based meat analog to about 1, about 2, about 3, about 4, about 5, about 6, about 7, about 8, about 9, about 10, about 11, about 12 and or about 13. In another embodiment, a pH adjusting agent can bring the pH of the plant-based meat analog to have a pH of between 7.2 and about 12, between 7.2 and about 10, between 7.4 and about 10.0, between 7.6 and about 9.0, between 7.8 and about 9.0, between about 8.0 and about 9.0, or between about 8 and about 10. In a further embodiment the pH of the pH adjusting agents is lower than 7, between 6.95 and about 2, between 6.95 and about 4, between about 4 and about 2, higher than 7.05, between 7.05 and about 12, between 7.05 and about 10, between 7.05 and about 8, between about 9 and about 12, or between about 10 and about 12.

In an embodiment, the plant-based meat analog can be shaped into strips like those commonly associated with bacon. Bacon can have any shape, including a square, a rectangular, a circle, and/or any non-geometric shape. In one embodiment, the bacon strips have a length (the longer distance between bacon ends) from top to bottom of about 1 mm, about 2 mm, about 3 mm, about 4 mm, about 5 mm, about 6 mm, about 7 mm, about 8 mm, about 9 mm, about 10 mm, about 20 mm, about 30 mm, about 40 mm, about 50 mm, about 60 mm, about 70 mm, about 80 mm, about 90 mm, about 100 mm, about 110 mm, about 120 mm, about 130 mm, about 140 mm, about 150 mm, about 160 mm, about 170 mm, about 180 mm, about 190 mm, about 200 mm, or larger.

In another embodiment, the bacon strips have a length (the longer distance between bacon ends) from top to bottom of at least 1 mm, at least 2 mm, at least 3 mm, at least 4 mm, at least 5 mm, at least 6 mm, at least 7 mm, at least 8 mm, at least 9 mm, at least 10 mm, at least 20 mm, at least 30 mm, at least 40 mm, at least 50 mm, at least 60 mm, at least 70 mm, at least 80 mm, at least 90 mm, at least 100 mm, at least 110 mm, at least 120 mm, at least 130 mm, at least 140 mm, at least 150 mm, at least 160 mm, at least 170 mm, at least 180 mm, at least 190 mm, at least 200 mm, or larger.

In another embodiment, the bacon strips have a length (the longer distance between bacon ends) from top to bottom of no more than 1 mm, no more than 2 mm, no more than 3 mm, no more than 4 mm, no more than 5 mm, no more than 6 mm, no more than 7 mm, no more than 8 mm, no more than 9 mm, no more than 10 mm, no more than 20 mm, no more than 30 mm, no more than 40 mm, no more than 50 mm, no more than 60 mm, no more than 70 mm, no more than 80 mm, no more than 90 mm, no more than 100 mm, no more than 110 mm, no more than 120 mm, no more than 130 mm, no more than 140 mm, no more than 150 mm, no more than 160 mm, no more than 170 mm, no more than 180 mm, no more than 190 mm, at least 200 mm, or larger.

Rugosity is a measure of small-scale variations of amplitude in the height of a surface $f_r = A_r/A_g$, where $A_r$ is the real surface area, and $A_g$ is the geometric surface area. Rugosity calculations are commonly used in materials science to characterize surfaces.

In another embodiment, the plant-based meat analog, including a plant-based bacon has a rugosity after heating, including cooking that increases about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99% or about 100% compared to the rugosity of the unheated, including uncooked, plant-based meat analog, including a plant-based bacon.

In another embodiment, the plant-based meat analog, including a plant-based bacon has a rugosity after heating, including cooking that increases by at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99% or at least 100% compared to the rugosity of the unheated, including uncooked, plant-based meat analog, including a plant-based bacon.

In another embodiment, the plant-based meat analog, including a plant-based bacon has a rugosity after heating, including cooking that increases by no more than 1%, no more than 2%, no more than 3%, no more than 4%, no more than 5%, no more than 6%, no more than 7%, no more than 8%, no more than 9%, no more than 10%, no more than 11%, no more than 12%, no more than 13%, no more than 14%, no more than 15%, no more than 16%, no more than 17%, no more than 18%, no more than 19%, no more than 20%, no more than 21%, no more than 22%, no more than 23%, no more than 24%, no more than 25%, no more than 26%, no more than 27%, no more than 28%, no more than 29%, no more than 30%, no more than 31%, no more than 32%, no more than 33%, no more than 34%, no more than 35%, no more than 36%, no more than 37%, no more than 38%, no more than 39%, no more than 40%, no more than 41%, no more than 42%, no more than 43%, no more than 44%, no more than 45%, no more than 46%, no more than 47%, no more than 48%, no more than 49%, no more than 50%, no more than 51%, no more than 52%, no more than 53%, no more than 54%, no more than 55%, no more than 56%, no more than 57%, no more than 58%, no more than 59%, no more than 60%, no more than 61%, no more than 62%, no more than 63%, no more than 64%, no more than 65%, no more than 66%, no more than 67%, no more than 68%, no more than 69%, no more than 70%, no more than 71%, no more than 72%, no more than 73%, no more than 74%, no more than 75%, no more than 76%, no more than 77%, no more than 78%, no more than 79%, no more than 80%, no more than 81%, no more than 82%, no more than 83%, no more than 84%, no more than 85%, no more than 86%, no more than 87%, no more than 88%, no more than 89%, no more than 90%, no more than 91%, no more than 92%, no more than 93%, no more than 94%, no more than 95%, no more than 96%, no more than 97%, no more than 98%, no more than 99% or no more than 100% compared to the rugosity of the unheated, including uncooked, plant-based meat analog, including a plant-based bacon.

A further novel aspect of the present invention is a process that can be used with the aforesaid novel plant-based compositions to more closely mimic the appearance of an iconic animal meat product, namely sliced animal bacon. Animal (e.g. pork) bacon typically is marketed in elongated strips (e.g. 10-12 in length) with the meat portion and the fat portion occupying discrete fields which may be irregular but generally continuous, along the slice length but being generally intermittent in the slice-width direction. It is believed that the overall heterogeneity created by the distinct meat and fat portions creates a heterogeneity of texture, mouthfeel (e.g. crispiness), taste, and appearance that is important in making a plant-based bacon product more similar to the animal product, and thus more marketable.

In an embodiment of the process of the present invention, separate mixtures of a plant-based "meat" analog and a plant-based "fat" analog are deposited side-by-side on a base, (e.g. a conveyor belt), which may be moving in the length direction. The deposition (e.g. by pultrusion) can create adjacent fields of meat analog and fat analog in the product width direction, the width dimensions of which fields can be varied by varying the respective flow rates and/or width positions of the dispensing nozzles. The flow rates and/or relative movement of the base to the nozzles can be adjusted to achieve different dough thicknesses (i.e. to make "thick" bacon analog slices or "thin" slices).

In another embodiment of the process of the present invention, the separate mixtures of plant-based meat and fat analogs are deposited on a base that is an edible layer of plant-based hydrocolloid film. Another hydrocolloid film may further be deposited on top of the meat and fat portions to encase the food product between two hydrocolloid film layers.

Figure 11A:
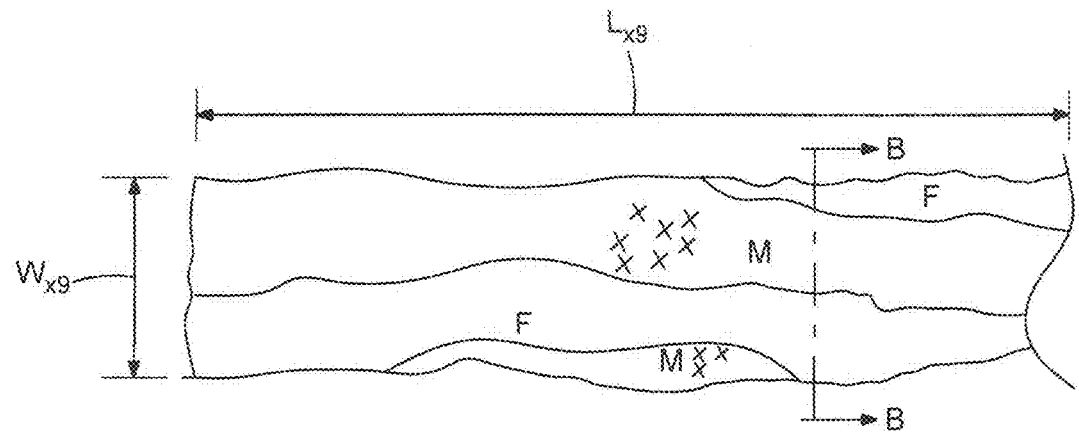
Figure 11B:
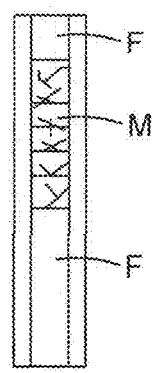
Figure 11C:
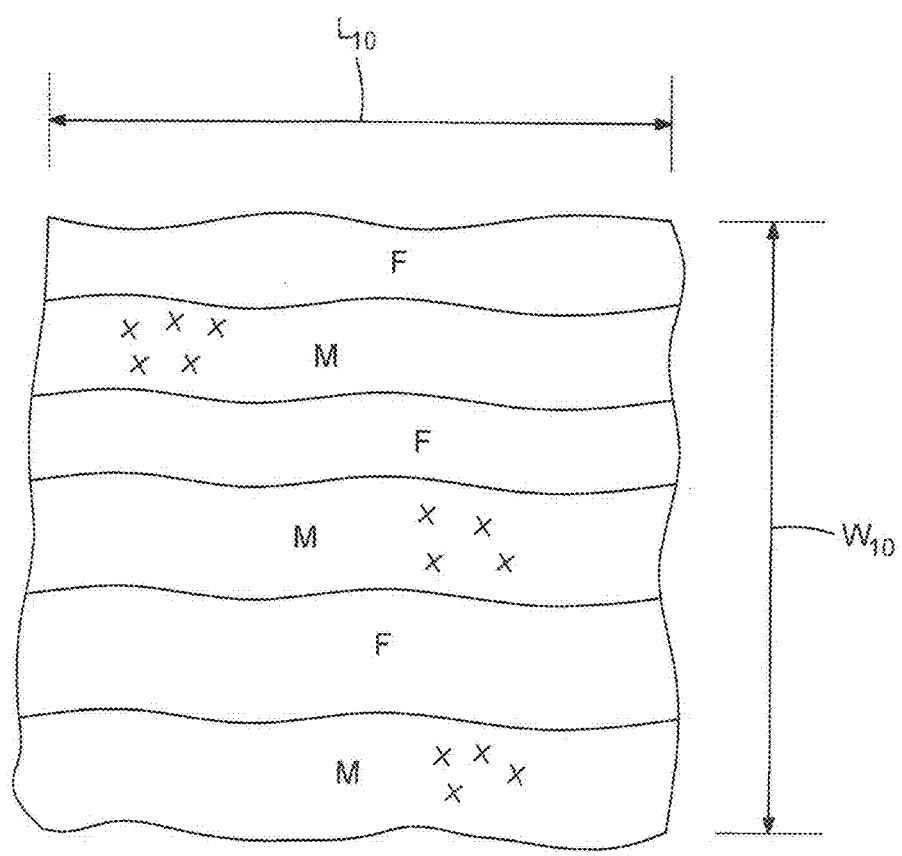

FIGS. 11A, 11B, and 11O are schematic representations of plant-based bacon products. In FIG. 11A, the plant-based bacon strip made in accordance with the inventive process has length L11 and width W11, where the ratio of L11/W11 is >>1. The strip shown in 11A has two plant-based meat analog fields M, and two plant-based fat analog fields F. In FIG. 11B, a cross-sectional view of the planar representation of strip 11A at BB, the sections comprising the plant-based bacon meat and fat analogs M and F, respectively, are shown. FIG. 11C shows an alternate construction of 11A in which two thin and transparent hydrocolloid films "sandwich" the bacon meat and fat portions.

FIG. 11C depicts schematically a plant-based bacon analog product that shares most of the process features of the strip in 11A discussed above except the planar dimensions and number of meat analog and fat analog fields. Specifically, length L12 is similar to width W12, yielding a L/W ratio=or ~1, and having three meat analog fields M, and three fat analog fields F. Also, product Y is sized to approximate the size and shape of standard loaf bread slices (about 5-6 inches per side), offering the convenience of using a single-piece bacon analog product in a sandwich.

A disadvantage of many natural and artificial colorants in the food product industry is that they are not stable in their locations within the food product. Upon heating, melting, or thawing of the food product, the colorant, which may be either fat-soluble or water-soluble will 'leak' from the system. This is a particular disadvantage in meat analog systems, in which the colorant is often a natural colorant such as beet juice or anthocyanins, or an artificial colorant such as Sensient Red, or a mix of both. When the food product analog is thawed or cooked, the colorant (generally red to simulate meat) may be released from the product in liquid or oil form (referred herein as "bleeding"), and this bleeding results in a product that loses its ability to look like the meat analog it is intended to replace. This can result in a negative reaction from a consumer as the bleeding highlights a difference between the meat analog and the look and taste of eating real animal meat, where generally the red part is the meat and the clear part the fat.

In contrast to the colorants previously described seaweed protein as a colorant is quite stable with respect to its location in a food product. Using phycoerythrin or other phycobilisomes as the colorant, the chromophore(s) are covalently bonded to the protein. Seaweed proteins are relatively large molecules compared to other colorants typically used. Therefore the use of seaweed proteins as colorants can be used to improve the location stability of the colorant system. In the example of creating a bacon product, when cooked, or placed on a plate post-cooking, the red color does not separate from the bacon meat analog fraction and bleed into the fat analog fraction or generally out of the bacon analog. Similarly, when a burger analog comprises seaweed protein as a colorant, when it is transformed from a frozen patty to a thawed patty, and when the thawed patty is heated on a skillet, the red color does not leak from the patty or migrate into the fat or liquid portions of the burger analog.

In an embodiment, a stable seaweed protein colorant used in a meat analog is R-phycoerythrin, B-phycoerythrin, C-phycoerythrin, phycocyanin, allophycocyanin, or phycoerythrocyanin. In another embodiment, two of more seaweed proteins are used as a colorant.

In an embodiment, a chromophore attached to a seaweed protein used as a colorant is one or more of phycoerythrobilin, phycocyanobilin, phycourobilin, 15,16-dihydrobiliverdin, or biliverdine IX alpha. In another embodiment, two of more seaweed proteins are used as a colorant.

In an embodiment, a stable seaweed protein colorant in a meat analog portion of a composite formed of a meat analog portion and a fat analog portion is does not migrate from the meat portion into the fat portion, or into any liquid escaping the product when stored, frozen, or cooked.

In an embodiment, a stable seaweed protein colorant is bound within a hydrocolloid gel.

In an embodiment, a stable seaweed protein colorant is bound within an oleogel.

In an embodiment, a stable seaweed protein colorant is bound within a hydrocolloid film.

In another embodiment, a plant-based meat analog may be packaged to keep them clean, fresh, contained and/or safe. In another embodiment, the packaging is meant to allow for inventory control, handling, distribution, stacking, display, sale, opening, reclosing, use, or reuse and/or to enable control of portion size. Suitable packing comprises trays, trays with overwrap, bags, cups, films, jars, tubs, bottles, pads, bowls, platters, boxes, cans, cartons, pallets, wrappers, containers, bags-in-boxes, tubes, capsules, vacuum packaging, pouches, and the like, and combinations thereof. The packaging can be made of plastic, paper, metal, glass, paperboard, polypropylene, PET, Styrofoam, aluminum, or combinations thereof.

In an embodiment, the packaging may carry one or more labels that communicate information to the consumer or that support the marketing of the plant-based meat analog. In a further embodiment, the packaging carries a label required by federal, state or a local governmental regulation. In one embodiment, the label is required by regulation of the U.S. Food and Drug Administration (FDA) or the U.S. Department of Agriculture (USDA). In another embodiment, the label is required by regulation of the European Food Safety Authority. In a further embodiment, the governmental regulation is Title 21 of the FDA section of the code of federal regulations. In another embodiment, the label indicates that the enclosed meat analog is free of genetically modified organisms. In another embodiment, the label indicates that the enclosed meat analog is free of gluten. In one more embodiment, the label indicates that the enclosed meat analog is Kosher. In another embodiment, the label indicates that the enclosed meat analog is free of cholesterol. In another embodiment, the label indicates that the plant-based meat analog is vegan. In a further embodiment, the label indicates that the meat analog is free of an allergen. In another embodiment, the label indicates that the meat analog is free of soy. In one more embodiment, the label indicates that the meat analog is free of nuts.

In an embodiment, the protein used in a meat analog may be comprised of polypeptide molecules having an identical amino acid sequence, or of a mixture of polypeptide molecules having at least 2 different amino acid sequences. In a further embodiment, the protein used a meat analog may be comprised of naturally occurring amino acids or non-naturally occurring amino acids. In a further embodiment, the protein used to create the protein-based meat analog can be derived and/or obtained from one or more sources, including algae, seaweed or one or more other plant sources, including wheat, soy and pea. In another embodiment, the protein used to create the meat analog can be derived and/or obtained from a seaweed and a protein concentrate source wherein the protein is manufactured synthetically using natural or non-natural amino acids. In some embodiments, the protein used to create the meat analog can be derived and/or obtained from a plant or an animal source, including a cow, a sheep, a goat, a pig, a duck, a horse, an ostrich or an emu. In another embodiment, the protein used to create the dough can be derived and/or obtained from a plant source and an animal source, including a fish, a shellfish, or a crustacean. In some embodiments, the protein is not derived from a plant source but is identical or similar to protein found in a plant source, for example, the protein is synthetically or biosynthetically generated but comprises polypeptide molecules that have an identical or similar amino acid sequence as polypeptide molecules found in an animal source.

In an embodiment, the ratio of protein derived, sourced and/or obtained from one type of plant used in a meat analog versus derived, sourced and/or obtained from a second type of plant or an animal (e.g. other plant, synthetically produced or animal) is 1:99, 2:98, 3:97, 4:96, 5:95, 6:94, 7:93, 8:92, 9:91, 10:90, 11:89, 12:88, 13:87, 14:86, 15:85, 16:84, 17:83, 18:82, 19:81, 20:80, 21:79, 22:78, 23:77, 24:76, 25:75, 26:74, 27:73, 28:72, 29:71, 30:70, 31:69, 32:68, 33:67, 34:66, 35:65, 36:64, 37:63, 38:62, 39:61, 40:60, 41:59, 42:58, 43:87, 44:56, 45:55, 46:54, 47:53, 48:52, 49:51, 50:50, 51:49, 52:48, 53:47, 54:46, 55:45, 56:44, 57:43, 58:42, 59:41, 60:40, 61:39, 62:38, 63:37, 64:36, 65:35, 66:34, 67:33, 68:32, 69:31, 70:30, 71, 29, 72:28, 73:27, 74:26, 75:25, 76:24, 77:23, 78:22, 79:21, 80:20, 81:19, 82:18, 83:17, 84:16, 85:15, 84:16, 85:15, 86:14, 87:13, 88:12, 89:11, 90:10, 91:9, 92:8, 93:7, 94:6, 95:5, 96:4, 97:3, 98:2 or 99:1. In a further embodiment, the meat analog is comprised of a protein derived, sourced and/or obtained from 1, 2, 3, 4, 5, 6, 7, 8, 9, 10 or more different plant or animal sources.

Example 1

A layered meat analog food component in accordance with the present invention was prepared using a seaweed-based hydrocolloid film and a soy-based dough. The film was derived from an agar-containing seaweed and contained about 95% water by mass. The dough was comprised of 80% soy protein isolate and 20% coconut oil by mass. The hydrated film in this example was elastic, with elongation at break of about 80%. The dimensions of the film when laid flat was 3 cm×2 cm in length and width, respectively, with a thickness (height) of about 0.2 mm. The film was translucent, with a transmissivity of about 90%, and with a color that was reddish pink. The soy-based dough was opaque, with a color that was brownish yellow.

The layered food component was formed by placing the hydrated film on wax paper on a flat surface, then coating the film with a layer of dough with a uniform thickness of about 3 mm, and subsequently rolling the coated film into a spiral form with the film on the outside of the roll. The rolled composite created in this manner had several layers of dough each separated by the hydrocolloid film.

The color and translucency of the hydrocolloid film in this example created the appearance that the dough inside the composite was reddish pink in color, such as the color of raw chicken. The film in this example also acted as a barrier layer to oil migration, and substantially reduced the amount of coconut oil that leaked outside the composite when it was placed on white paper, as compared to oil leakage from dough containing no film.

Example 2

A meat analog bacon was created in accordance with the following method and formulation. First, 100 mL water, 6 g agar, 3 g salt, 35 g vegetable oil and bacon flavor were mixed together and then heated to a final temperature of 95° C. (200° F.), though higher temperatures could be used in order to dissolve the agar and create an oil-in-water emulsion. The oil/water/agar emulsion was split into two approximately equal portions in two separate containers (one half for what will be used to create the meat analog bacon fat and one half for the meat portion of the meat analog bacon product) and kept at a temperature of 38° C. (100° F.), though higher temperatures could be used to avoid the oil/agar and water starting to gel.

To prepare the meat portion of the final meat analog bacon product, the temperature of the oil/water/agar emulsion was dropped to about 52° C. (125° F.). Next about 0.4 g of a seaweed protein concentrate was added to the oil/water/agar and the oil/water/agar/seaweed protein concentrate was well mixed.

Both the fat and meat portions were kept warm and well-mixed and then heated to about 100° F. Once the fat and meat portions reached a temperature around 100 F, both portions were gently poured into a bacon pattern to separate fat and meat analog portions to mimic the look of a bacon derived, sourced and/or based from an animal. Once the portions were poured into the bacon pattern, the bacon meat analog was allowed to gel and set.

Once the bacon meat analog was gelled and set, the bacon meat analog was dehydrated at a temperature of 74° C. (165° F.), until the bacon meat analog was of the desired crispiness and textural and sensorial feel, and to a water activity level of about 0.6 to 0.9. An example of a bacon meat analog created by the aforementioned method of Example 2 is shown in FIG. 9.

Example 3: Stability of a Meat-Like Bacon Following Dehydration

In this example a fat portion is prepared and processed and cut into strips of a meat-like bacon (hereinafter "bacon strips") with a wet dimension (width v. length) of 1 inch by 3.25 inches and with a height of 4 mm. The bacon strips are comprised of the following ingredients at the identified concentrations in grams.

To prepare the fat sample, water was heated to 190° F. Agar, salt, and sugar were mixed in at high shear with a blender. The oil was then mixed in with a fork at low shear. The mixture was chilled in a mold until it was set into a gel.

TABLE 2

Control Water Activity Bacon Strip Composition (Ingredients and Amounts)
CONTROL

| INGREDIENT | GRAMS | % |
| --- | --- | --- |
| WATER | 215.00 | 79.78 |
| AGAR AGAR 100 | 12.00 | 4.45 |
| OIL, COCONUT | 35.00 | 12.99 |
| SALT | 5.00 | 1.86 |
| SUGAR, CANE | 2.50 | 0.93 |
| TOTAL | 269.50 | 100.00 |

These bacon strips were weighed for their fully hydrated weight. The bacon strings were then placed in a dehydrator at 165° F. An individual bacon strips was removed from the dehydrator at different times after being placed in the dehydrator. More particularly, a bacon strip was removed at 30 minutes following being placed in the dehydrator and then every thirty (30) minutes thereafter at 30, 60, 90, 120, 150 and 180 minutes. A bacon strip was also not dehydrated as a control. Each bacon strip was weighted following dehydration. The bacon strips were sealed in a plastic bag and held at 38° F. for about 12-15 hours after removal from the dehydrator (or immediately for the control).

A single bacon strip was used for each length of time in the dehydrator and following dehydration was cut into three pieces. Prior to cutting, the water activity of three cross-sectional slices of each bacon strip was measured.

The strips were then placed on an un-greased sheet pan and baked at 350° F. for five (5) minutes at 0% humidity.

The results found in FIG. 10 show that the bacon strips that were dehydrated for the longest period of time maintained their form, composition and the components that comprise the bacon strips in the bacon strip itself. In contrast, those bacon strips that were dehydrated for the shortest period, e.g. 30 minutes, tended to melt and leak out the components that comprise the bacon strips into the pan.

Additional results are shown for each bacon strip dehydrated for the time set forth below:

TABLE 3

Control Water Activity Bacon Strip Composition (Ingredients and Amounts)

| Dehydration time in minutes (hours) | Wet weight (g) | Control Water Activity | | | Dried weight (g) | Water loss (g) | Observe melt (y/n) | Tasting notes |
|---|---|---|---|---|---|---|---|---|
| 0 | 8.740 | 1.000 | 1.000 | 0.996 | 8.740 | 0.000 | YES | chewy, gummy, salty, wet, clearish color |
| 30 (0.5) | 8.470 | 1.000 | 0.995 | 0.992 | 5.250 | 3.220 | YES | chewy, gummy, salty, wet, clearis color |
| 60 (1) | 9.000 | 0.981 | 0.977 | 0.976 | 4.340 | 4.660 | YES | not stuck to pan, but also chewy, gummy, salty, wet, clear |
| 90 (1.5) | 7.860 | 0.904 | 0.888 | 0.877 | 2.420 | 5.440 | NO | slight chew, less gummy - white cloudy |
| 120 (2) | 8.090 | 0.793 | 0.796 | 0.799 | 2.320 | 5.770 | NO | slight chew, almost like wet starchy veg? keeps shape, slight puff |
| 150 | 8.010 | 0.717 | 0.726 | 0.726 | 2.100 | 5.910 | NO | crunch, moist, fatty, keeps shape, has integrity |
| 180 | 8.770 | 0.705 | 0.711 | 0.715 | 2.210 | 6.560 | NO | stiff, dense, slight crunch |
| 210 | 8.720 | 0.692 | 0.697 | 0.695 | 2.210 | 6.510 | NO | crunchy, less fatty, pleasant texture |

TABLE 4

Water Activity Bacon Strip Composition (Ingredients and Amounts) 2X Fat

| INGREDIENT | GRAMS | % |
|---|---|---|
| WATER | 215.00 | 70.61 |
| AGAR AGAR 100 | 12.00 | 3.94 |
| OIL, COCONUT | 70.00 | 22.99 |
| SALT | 5.00 | 1.64 |
| SUGAR, CANE | 2.50 | 0.82 |
| TOTAL | 304.50 | 100.00 |

TABLE 5

Water Activity for 2X Fat

| TIME | Wet weight (g) | 2X FAT WATER ACTIVITY | | | Dried weight (g) | Water loss (g) | Observe melt (y/n) | Tasting notes |
|---|---|---|---|---|---|---|---|---|
| 0 | 9.4 | 0.972 | 0.964 | 0.966 | 9.4 | 0 | YES | less wet, slight chew, slight gummy, better than control, translucent |
| 30 | 9.29 | 0.955 | 0.951 | 0.963 | 6.49 | 2.8 | YES | slight bite, lardlike, translucent |
| 1 | 9.25 | 0.933 | 0.931 | 0.942 | 5.66 | 3.59 | YES | chewy, salty, kept flavor better than first two, sort of melt in mouth, not bad |
| 1.5* | 9.38 | 0.927 | 0.935 | 0.942 | 5.27 | 4.1 | NO | bendy, but keeps shape - salty, chewy, tasty, melty fat mouthfeel |
| 2 | 9.16 | 0.903 | 0.905 | 0.911 | 4.49 | 4.67 | NO | translucent, clearish - salty, slightly chewy |
| 2.5* | 9.18 | 0.882 | 0.901 | 0.901 | 4.49 | 4.69 | NO | salty good taste, melt in mouth, luscious, yum clear/translucent |
| 3* | 9.11 | 0.839 | 0.836 | 0.836 | 4.04 | 5.07 | NO | saltier? Less melt/mouth coating, satisfying. Keeps shape, more chew |

TABLE 5-continued

Water Activity for 2X Fat

| TIME | Wet weight (g) | 2X FAT WATER ACTIVITY | | | Dried weight (g) | Water loss (g) | Observe melt (y/n) | Tasting notes |
|---|---|---|---|---|---|---|---|---|
| 3.5* | 9.05 | 0.778 | 0.788 | 0.788 | 3.61 | 5.44 | NO | sort of cracker like crunch with fat explosion + salt maybe too crispy, but super tasty |

It was found that the 2× fat bacon strips that were dehydrated for between 150-210 minutes provided for an improved taste, mouthfeel and texture as compared to similar bacon strips that had not been dehydrated for as long a period of time.

Example 4: Example of Bacon Analog

A bacon analog is created by mixing together Agar Agar 100 with an oil (e.g. coconut oil), salt, and water. To this mixture is added a flavoring (e.g. bacon flavoring, sugar). The mixture is split into two portions. One part, which is clear constitutes the fat portion of a bacon analog and to the other art is added a protein and a red dye (e.g. Sensient Red, OB) to give the appearance of the meat portion of a bacon analog.

The two portions are poured into a mold with clear (fatty analog) and reddish (meat analog) portions. The final bacon analog has a look as set forth in FIG. 11B, where the clear (fatty analog or "F") portions surround the reddish (meat analog or "M") portions, to create a bacon analog in a strip-like structure. This bacon analog can be heated and then eaten. The final heated bacon analog has a texture, look and taste similar to that of bacon obtained from an animal, including a pig.

Example 5. Location Stability of Seaweed Protein

Figures 12A, 12B:
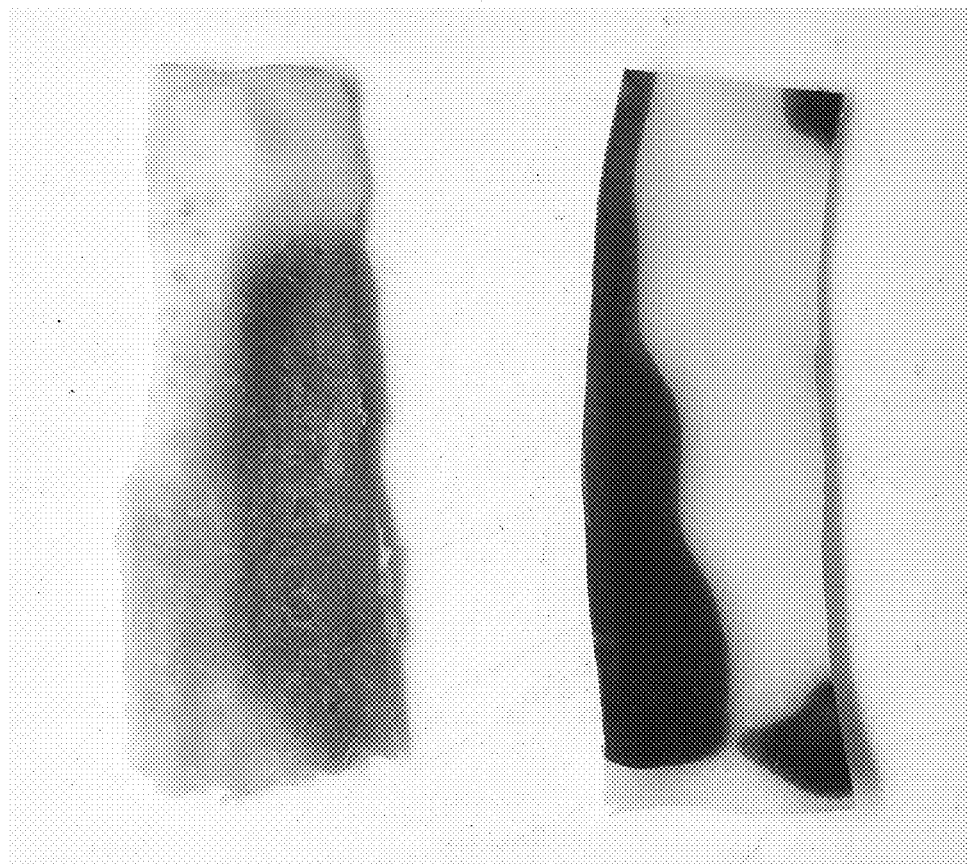
FIG. 12A shows a commercially sold bacon analog with colorant migration and FIG. 12B shows a bacon analog without colorant migration.

FIGS. 12A and B shows two strips of plant-based bacon, both in an uncooked state and after storage at 40° F. for 7 days. FIG. 12A on the left shows a commercially sold plant-based bacon composed of starch and oil, with beet juice as the colorant. The strip on the right (12B) shows an example of the plant-based bacon of the present invention, made with hydrocolloid-based oleogels in both the fat and meat parts. The example 12B on the right was made with a seaweed protein containing phycoerythrin as a colorant in the darker colored meat part.

In FIG. 12A, one can observe that the beet juice color in the commercially sold plant-based bacon product has diffused into the fat portion of the product. The visible diffusion is distinctively unlike real animal bacon, in which the red color of the meat sections does not separate and migrate into the fat portion.

In contrast, one can observe from the plant-based meat analog on the right (12B) that there is a highly defined line between the fat portion and the meat portion colored with seaweed protein, and there is no migration of the protein colorant from the meat portion into the fat portion after storage for one week.

Example 6. Flavorings Effect on Taste and Palatability

Two bacon analogs were prepared according to the present invention, both with a fat portion and a meat portion. Both samples were prepared using the same formula for the fat portion (lighter portion of strip). One sample (sample 1.1) was prepared with "meat 1" composition (darker portion of strip), and another (sample 2.2) was prepared with "meat 4" composition provided in Table 5 below.

The difference between Samples 1.1 and 2.2 was the flavorings used in the meat portion. Both meat 1 (sample 1.1) and meat 4 (sample 2.2) contained 3.5 to 3.6 grams of one type of commercially sold flavoring, while meat 4 (sample 2.2) contained an additional flavoring to import a bacon flavor to the meat portion.

TABLE 5

Composition of Two Meat Samples

| INGREDIENT | FAT PORTION GRAMS | MEAT 1 (sample 1.1) GRAMS | MEAT 4 (sample 2.2) GRAMS |
|---|---|---|---|
| WATER | 30.00 | 30.00 | 30.00 |
| AGAR AGAR 100 | 12.00 | 12.00 | 12.00 |
| OIL, COCONUT | 35.00 | 35.00 | 35.00 |
| SALT | 5.00 | 3.00 | 4.00 |
| PROTEIN, NORI | | 1.20 | 1.20 |
| COLORANT 1 | | 1.20 | 1.20 |
| FLAVORING 1 | | 3.50 | 3.60 |
| SUGAR, CANE | 2.50 | 2.00 | 2.00 |
| FLAVORING 2 | | | 0.40 |
| TOTAL | 84.50 | 87.90 | 89.40 |

A taste test was conducted with a sample size of 10 taste testers. Example of responses from several taste testers are set forth below:
  a. Test Taker #1: Sample 1.1 has a fishy flavor, which they did not like.
  b. Test Taker #2. Sample 1.1 is an acquired taste; where after the first bite they were unsure if they liked it, but it grew on them after a few bites. Test Taker #2 also found the salt level to be great, not too high, not too low. Test Taker #2 found Sample 2.2 to have a great flavor and salt level and found it to be closer to real pork-based bacon than Sample 1.1. Test Taker #3. Found that Sample 1.1 tasted a bit fishy, while Sample 2.2 had a meatier texture and composition with less aftertaste.
  c. Test Taker #4. Found that Sample 1.1 was not very palatable, with a "sea-water" flavor, while Sample 2.2 was found to be tastier at both hot and room temperatures. Further, The results of the taste test determined that taste testers found that Meat 4 (sample 2.2) was meatier, and less fishy, than Meat 1 (sample 1.1). Only a few taste testers found the flavor "fishy" when they describe Meat 1. None of the taste testers found Meat 4 to be "fishy," although some described a trace taste of seaweed.

Based on the results of the Taste Testers it was determined that the type of flavoring has an impact on the ability to mask an unpleasant flavor associated with a seaweed protein, while at the same time enhancing the bacon flavor.

Example 7: Comparison of Audio Data for Bacon and Meat Analog-Bacon

The sound of chewing a bacon analog made using a dehydrated oil-in-hydrocolloid gel according to the present invention was recorded before and after dehydration and compared to the sound of biting into a real piece of cooked pork bacon while still warm.

Figures 13A, 13B, 13C:
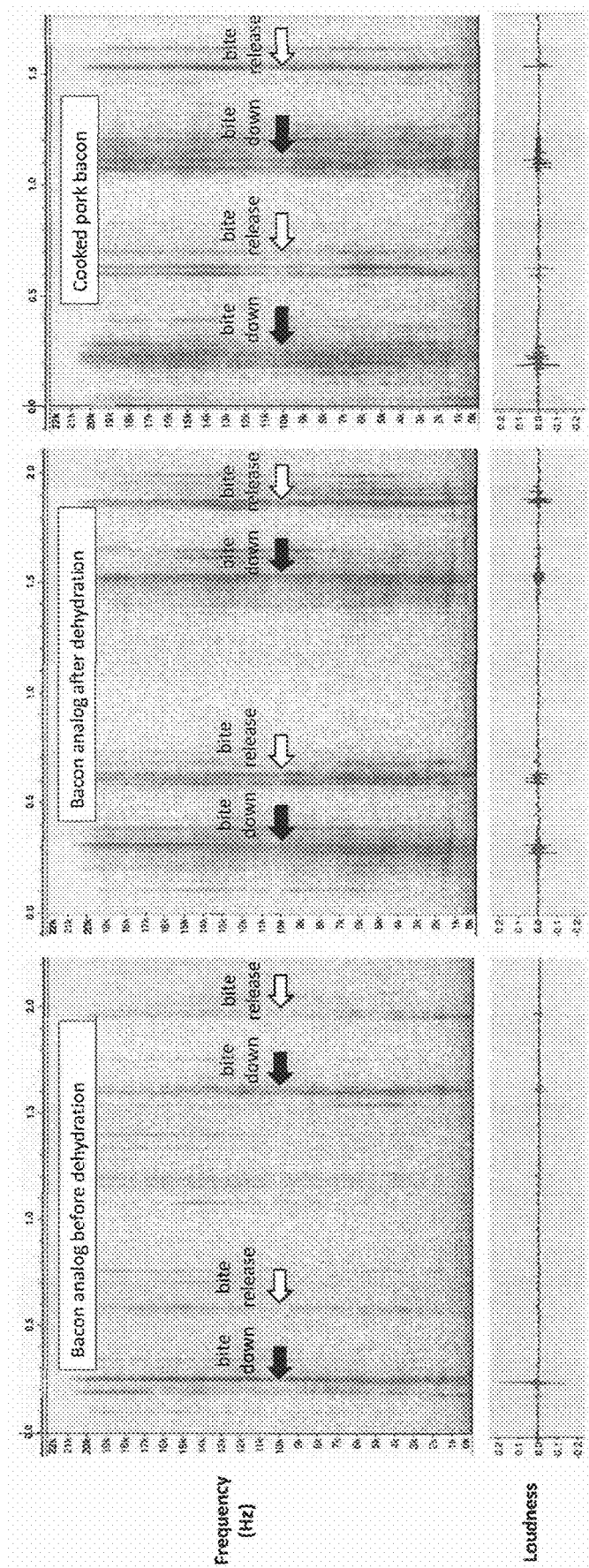
FIGS. 13A, 13B and 13C show audio patterns following chewing a non-dehydrated bacon meat analog, a dehydrated bacon meat analog and pork bacon.
Figure 14A:
FIGS. 14A and 14B show different examples of a dehydrated bacon meat analog with the textural look following dehydration.
Figure 14B:
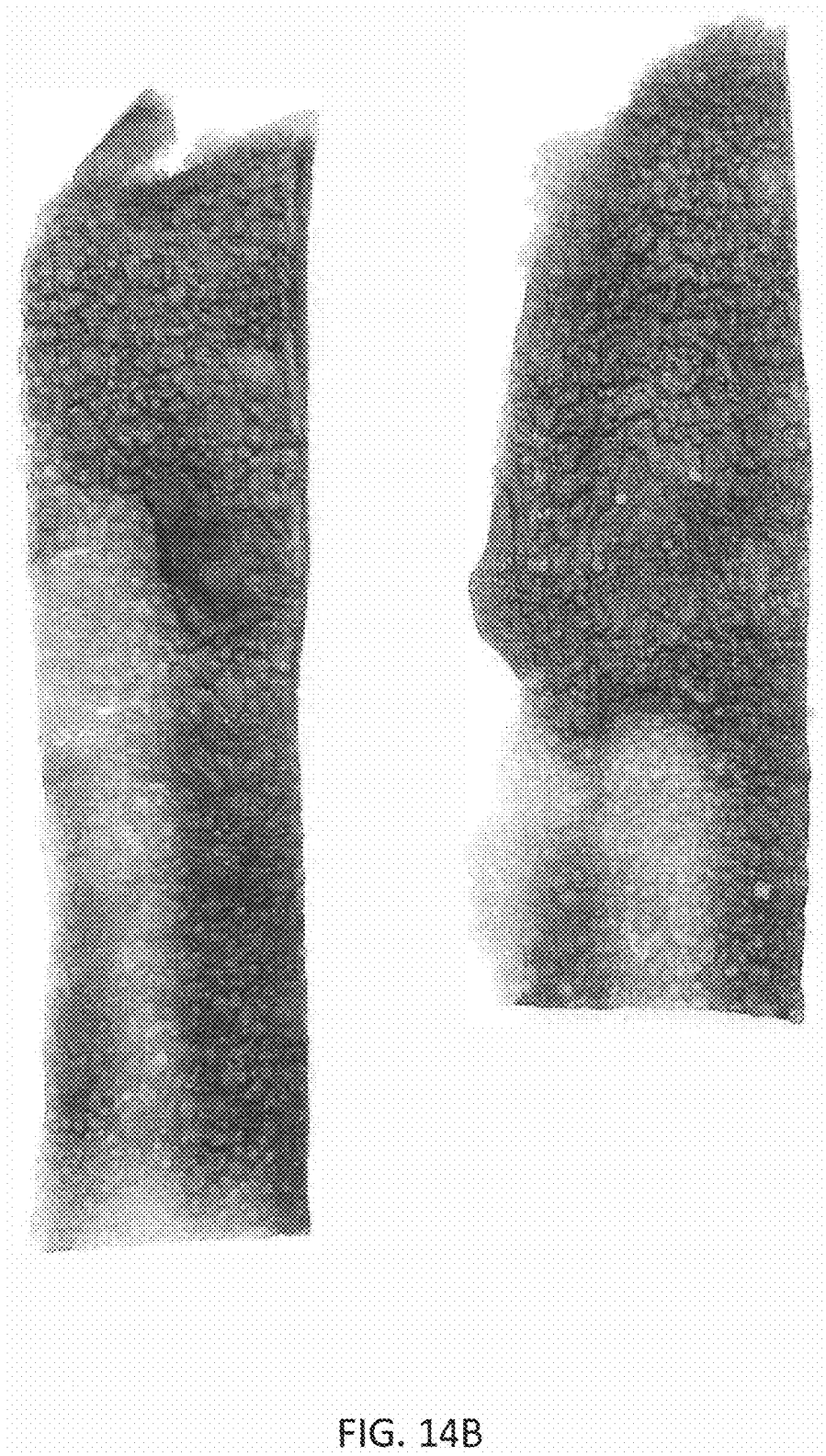

Both loudness and frequency were measured with a computer using the audio software Audacity and a Yeti microphone input. Audio spectrograms and waveforms as depicted in FIGS. 13A-C were generated using Audacity. To test the sound of chewing, we had an individual take two consecutive chews of each sample at a distance of one inch from the microphone, using their forward molar teeth. The samples comprised a bacon meat-analog that was not dehydrated (FIG. 13A), a bacon meat-analog following dehydration (FIG. 13B) and a cooked pork bacon (FIG. 13C).

The frequency and loudness made by the samples when chewed are illustrated by the spectrograms and waveforms as depicted in FIGS. 13A, 13B and 13C, respectively. The bacon analog before dehydration as depicted in FIG. 13A produced a sound with a narrow band on the spectrogram on the bite down, and a very faint sound on the bite release. The sound made by the sample was similar to a snapping sound, but not a crispy sound associated with cooked pork bacon.

The invention claimed is:

1. A bacon analog, comprising a bacon fat analog and a bacon meat analog constructed in a pattern to resemble an animal bacon,
wherein:
the bacon fat analog portion comprises a first oil located within a first plant-based hydrocolloid gel, and the bacon meat analog portion comprises a second oil located within a second plant-based hydrocolloid gel;
the first and second hydrocolloid gels are at least one selected from the group consisting of agar, carrageenan, alginate, pectin, and gellan gum;
the first and second hydrocolloid gels are partially dehydrated;
the first oil and the second oil are the same or different;
the first hydrocolloid gel and the second hydrocolloid gel are the same or different;
the bacon analog has a water concentration of no more than 29 wt % and an oil concentration of greater than 35 wt %;
the bacon analog is free of egg albumen; and
the bacon analog is free of surfactants or free of starches.

2. The bacon analog of claim 1, which exhibits one or more of the following characteristics:
a) a crispy sound when bitten or chewed that is similar to an animal bacon when consumed,
b) a mouthfeel when bitten or chewed that is similar to an animal bacon when consumed,
c) a surface texture similar to an animal bacon prior to it being consumed, and
d) an elasticity similar to an animal bacon.

3. The bacon analog of claim 1 in which one or more colorant is added to one or both of the fat portion and meat portion, wherein the fat portion has a color similar to the fat portion of animal bacon and the meat portion has a color similar to the meat portion of animal bacon.

4. The bacon analog of claim 3, wherein at least one colorant is comprised of a protein derived from seaweed.

5. The bacon analog of claim 1, wherein a flavor is added to at least one of the fat portion and the meat portion of the bacon analog to produce a flavor that is similar to cooked animal bacon.

6. The bacon analog of claim 1, wherein at least one or both of the first and second oils is comprised of an unsaturated vegetable oil.

7. The bacon analog of claim 1, wherein the meat portion and fat portion are free of modified cellulose derivatives.

8. The bacon analog of claim 1, wherein at least one of the hydrocolloid gels does not melt when cooked at temperatures of about 300° F. to about 450° F.

9. The bacon analog of claim 1, wherein one or both of the first oil and second oil is comprised of droplets with a diameter of at least 0.1 mm.

10. The bacon analog of claim 1, wherein one or both of the meat portion and fat portion is comprised of a plurality of hydrocolloid films separating oil-containing layers and arranged in an orientation that produces a pattern resembling animal tissue on the surface of the bacon analog.

11. A bacon analog comprised of a fat portion and a meat portion,
wherein:
one or both portions are constructed of hydrocolloid films wherein the hydrocolloid films are derived from seaweed;
wherein, the hydrocolloid films comprising one or both the fat portion and meat portion are fused together by gelling;
one or both portions are constructed in forms of hydrocolloid gel matrix, wherein oil droplets are interspersed within the hydrocolloid gel matrix;
the bacon analog has a water concentration of no more than 29 wt % and an oil concentration of greater than 35 wt %;
the bacon analog is free of egg albumen; and
the bacon analog is free of surfactants or free of starches.

12. The bacon analog of claim 11, which comprises oil droplets having a diameter of at least 0.1 mm.

13. The bacon analog of claim 11, which exhibits one or more of the following characteristics:
a) a crispy sound when bitten or chewed that is similar to an animal bacon when consumed,
b) a mouthfeel when bitten or chewed that is similar to an animal bacon when consumed,
c) a surface texture similar to an animal bacon prior to it being consumed, and
d) an elasticity similar to an animal bacon.

14. The bacon analog of claim 11, wherein the hydrocolloid films in one or both of the fat portion and meat portion serve to restrict the movement of the oil within the respective portion.

15. The bacon analog of claim 11, wherein the hydrocolloid film is formed by the setting of an oil-in-hydrocolloid emulsion.

16. The bacon analog of claim 1, which comprises about 4% to about 20% of a carbohydrate, which is one or more of agar, carrageenan, alginate, pectin, and gellan gum, relative to a total weight of the bacon analog.

17. The bacon analog of claim 1, which has a water activity of no more than 0.7.

18. The bacon analog of claim 1, which has an oil concentration of at least 36 wt %.

19. The bacon analog of claim 11, which has an oil concentration of at least 36 wt %.

20. The bacon analog of claim 1, which has an oil concentration of at least 40 wt %.

21. The bacon analog of claim 11, which has an oil concentration of at least 40 wt %.

22. A bacon analog, comprising a bacon fat analog and a bacon meat analog,
wherein:
the bacon fat analog portion comprises a first oil located within a first plant-based hydrocolloid gel, and the bacon meat analog portion comprises a second oil located within a second plant-based hydrocolloid gel;
the first and second hydrocolloid gels are selected from the group consisting of: agar, carrageenan, alginate, pectin, and gellan gum;
the first and second hydrocolloid gels are partially dehydrated;
the first oil and the second oil are the same or different;
the first hydrocolloid gel and the second hydrocolloid gel are the same or different;
the bacon analog has a water concentration of no more than 29 wt % and an oil concentration of at least 40 wt %; and
the bacon analog is free of egg albumen, surfactants, and starches.

\* \* \* \* \*